United States Patent
Loman et al.

(10) Patent No.: US 10,650,141 B2
(45) Date of Patent: May 12, 2020

(54) MITIGATION OF RETURN-ORIENTED PROGRAMMING ATTACKS

(71) Applicant: Sophos Limited, Abingdon (GB)

(72) Inventors: Erik Jan Loman, Hengelo (NL); Lute Edwin Engels, Zuidwolde (NL); Andrew J. Thomas, Oxfordshire (GB); Kenneth D. Ray, Seattle, WA (US)

(73) Assignee: Sophos Limited, Abingdon (GB)

( * ) Notice: Subject to any disclaimer, the term of this patent is extended or adjusted under 35 U.S.C. 154(b) by 243 days.

(21) Appl. No.: 15/667,847

(22) Filed: Aug. 3, 2017

(65) Prior Publication Data

US 2018/0039776 A1 Feb. 8, 2018

Related U.S. Application Data

(60) Provisional application No. 62/370,680, filed on Aug. 3, 2016.

(51) Int. Cl.
*G06F 21/54* (2013.01)
*G06F 21/56* (2013.01)

(52) U.S. Cl.
CPC .......... *G06F 21/54* (2013.01); *G06F 21/566* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 8,214,900 B1 * | 7/2012 | Satish | G06F 21/554 726/23 |
| 9,928,359 B1 | 3/2018 | Vargas et al. | |
| 2014/0282431 A1 * | 9/2014 | Delio, Jr. | G06F 11/3466 717/130 |
| 2015/0161396 A1 * | 6/2015 | Hentunen | G06F 21/54 726/25 |
| 2016/0094552 A1 * | 3/2016 | Durham | G06F 21/00 713/171 |
| 2016/0180115 A1 * | 6/2016 | Yamada | G06F 21/805 711/163 |

OTHER PUBLICATIONS

IPO, "UK Application No. 1712491.8 Search Report dated Feb. 2, 2018", 4 pages.

* cited by examiner

*Primary Examiner* — Kaveh Abrishamkar
(74) *Attorney, Agent, or Firm* — Strategic Patents, P.C.

(57) ABSTRACT

Trampoline and return-oriented programming attacks employ a variety of techniques to maliciously execute instructions on a device in a manner different from a legitimate programmer's original intent. By instrumenting a device to detect deviations from predicted behavior, these exploits can be identified and mitigated.

20 Claims, 14 Drawing Sheets

| Address 904 | Instruction 906 | Most recent RAR line (from address – to address) 908 | Predicted 910 | Return address on Stack 912 |
|---|---|---|---|---|
| Addr_A | CALL X | --- | --- | Addr_B |
| Addr_B | CALL Y | X' – Addr_B | YES | Addr_C |
| Addr_C | XOR EAX, EAX | Y' – Addr_C | YES | --- |

| Address | Instruction | Most recent RAR line (from address – to address) | Predicted | Return address on Stack |
|---|---|---|---|---|
| Addr_Z | RET | --- | --- | Addr_B |
| Addr_A | CALL X | --- | --- | Addr_C |
| Addr_B | CALL Y | Z' – Addr_B | NO | --- |
| Addr_C | XOR EAX, EAX | Y' – Addr_C | YES | --- |

Non-normalized:

| Branch Trace | Opcode | To |
|---|---|---|
| 0x0F400F28 MSO.DLL | RET | 0x0F400E39 MSO.DLL |
| 0x0FEC881A MSO.DLL | ~RET | 0x01A565D4 (anonymous; WWLIB.DLL) |
| 0x0F82F52C MSO.DLL | RET | 0x0FEC8804 MSO.DLL |
| 0x0F3F2A7C MSO.DLL | RET | 0x0F82F52B MSO.DLL |
| 0x0FB741CC MSO.DLL | ~RET | 0x01A56FAF (anonymous; WWLIB.DLL) |
| 0x0FC21B12 MSO.DLL | RET | 0x0FB741B6 MSO.DLL |
| 0x0F3F2A7C MSO.DLL | RET | 0x0FC21B11 MSO.DLL |
| 0x0F3FA8D9 MSO.DLL | RET | 0x01A5624B (anonymous; WWLIB.DLL) |
| 0x108241D5 MSO.DLL | ~RET | 0x01A5623B (anonymous; WWLIB.DLL) |
| 0x102560E0 MSO.DLL | ~RET* | 0x0F450A39 MSO.DLL |

1404

Normalized:

| Branch Trace | Opcode | To |
|---|---|---|
| MSO.DLL + 00400F28 | | MSO.DLL + 00400E39 |
| MSO.DLL + 00EC881A | | (anonymous_allocbase + 000005D4; WWLIB.DLL) |
| MSO.DLL + 0082F52C | | MSO.DLL + 00EC8804 |
| MSO.DLL + 003F2A7C | | MSO.DLL + 0082F52B |
| MSO.DLL + 00B741CC | | (anonymous_allocbase + 00000FAF; WWLIB.DLL) |
| MSO.DLL + 00C21B12 | | MSO.DLL + 00B741B6 |
| MSO.DLL + 003F2A7C | | MSO.DLL + 00C21B11 |
| MSO.DLL + 003FA8D9 | | (anonymous_allocbase + 0000024B; WWLIB.DLL) |
| MSO.DLL + 018241D5 | | (anonymous_allocbase + 0000023B; WWLIB.DLL) |
| MSO.DLL + 012560E0 | | MSO.DLL + 00450A39 |

FIG. 14

MITIGATION OF RETURN-ORIENTED PROGRAMMING ATTACKS

RELATED APPLICATIONS

This application claims the benefit of U.S. Prov. App. No. 62/370,680 filed on Aug. 3, 2016, the entire content of which is hereby incorporated by reference.

TECHNICAL FIELD

This application relates to network security, and more specifically to techniques for mitigating return-oriented programming attacks in a networked computing environment.

BACKGROUND

Enterprise networks can contain valuable information that forms an increasingly attractive target for malicious actors. Useful techniques for securing endpoints in a network against malicious activity are described by way of example in commonly-owned U.S. Pat. No. 9,392,015 filed on Apr. 28, 2014, U.S. application Ser. No. 14/485,759 filed on Sep. 14, 2014, U.S. patent application Ser. No. 15/042,862 filed on Feb. 12, 2016, and U.S. application Ser. No. 15/179,447 filed on Jun. 10, 2016, each of which is hereby incorporated by reference in its entirety.

There remains a need for improved techniques to detect and prevent return-oriented programming attacks on endpoints in a computer network.

SUMMARY

Trampoline and return-oriented programming attacks employ a variety of techniques to maliciously execute instructions on a device in a manner different from a legitimate programmer's original intent. By instrumenting a device to detect deviations from predicted behavior, these exploits can be identified and mitigated.

In a trampoline or return-oriented programming attack, a memory location to which a stack pointer is directed is caused to contain a return address that is selected by an attacker. In a trampoline attack, the return address may be the address of code provided by the attacker. In a return oriented programming attack, a sequence of attacker-selected return addresses may be used more generally to execute sequences of instructions to obtain and exploit control of a computing device. In order to mitigate attacks of this manner, an import address table or similar control structure may be used so that an operating system loader may vary the addresses at which program functions may be located. In such cases, the import address table or similar structure may be a target of attack. In some implementations, an import address table or other control structure may be instrumented to detour function calls through additional programming stubs so that certain checks may be made. In this manner, return-oriented programming attacks can be efficiently detected when they direct execution to the detoured programming stubs.

In an aspect, a computer program product for hardware-assisted filtering of an import address table may comprise computer executable code embodied in a non-transitory computer readable medium that, when executing on one or more computing devices, performs the steps of configuring a computing environment to detour a first function call to a stub, where the computing environment uses an import address table to access system function calls and address space layout randomization to randomize a location of functions accessed through the import address table, where the computing environment includes a return address register that stores addresses for return from function calls, and where the computing environment generates a return address prediction based on the return register. The computer executable code may also perform the steps of determining by the stub when the stub is executed whether the return address prediction was to the stub by comparing the address of the stub to the return address prediction, and generating an indication of a return-oriented programming attack when the address does not match the return address prediction.

Implementations may include one or more of the following features. The return address prediction may be generated by speculatively fetching and executing a branch of programming code, e.g., to provide the predicted return address. The function call may be a call to a system function. The function call may be a memory control function. The function call may be a call transferring control from a user space to a kernel in a system space.

In an aspect, a computer program product for hardware-assisted filtering of an import address table may include computer executable code embodied in a non-transitory computer readable medium that, when executing on one or more computing devices, performs the step of configuring a computing environment to detour a first function call to a stub, where the computing environment uses an import address table to access system function calls and address space layout randomization to randomize a location of functions accessed through the import address table, where the computing environment includes a return address register that stores addresses for return from function calls, and where the computing environment generates a return address prediction based on the return register. The computer program product may also perform the steps of determining by the stub when the stub is executed whether the return address prediction was to the stub by comparing the address of the stub to the return address prediction, and generating an indication of a return-oriented programming attack when the address does not match the return address prediction.

Implementations may include one or more of the following features. The return address prediction may be generated by speculatively fetching and executing a branch of programming code. The function call may be a call to a system function. The function call may be a memory control function. The function call may be a call transferring control from a user space to a kernel in a system space.

In an aspect, a method may include configuring a computing environment to detour a function call to a stub, where the computing environment includes a return address register that stores addresses for returns from function calls, and where the computing environment generates a return address prediction based on the return address register. The method may also include determining by the stub when the stub is executed whether the return address prediction was to the stub, and generating an indication of a return-oriented programming attack when the address does not match the return address prediction.

Implementations may include one or more of the following features. The computing environment may use an import address table to access system function calls. The computing environment may use address space layout randomization to randomize a location of functions accessed through the import address table. The return address prediction may be generated by speculatively fetching and executing a branch of programming code to provide the predicted return address. The function call may be a call to a system function.

The function call may be a memory control function. The function call may be a call transferring control from a user space to a kernel in a system space. The method may further include instrumenting the computing environment to monitor system calls by detouring a plurality of system functions to a plurality of stubs. The method may further include responding to the indication of the return-oriented programming attack by updating a health status of a computing device in a heartbeat generated by the computing device. The method may further include responding to the indication of the return-oriented programming attack by coloring at least one of a file, a process, or an application with an indication of the return-oriented programming attack. The method may further include responding to the indication of the return-oriented programming attack by initiating a root cause analysis on a computing device.

In an aspect, a system may include one or more processors executing an operating system with a user space and a system space, a memory for non-transitory storage of computer-readable data, and computer executable code stored in the memory and executable by the one or more processors to perform the step of configuring a computing environment to detour a function call to a stub, where the computing environment includes a return address store that stores addresses for a return from function calls, and where the computing environment generates a return address prediction based on the return address store, the computer executable code further configuring the one or more processors to perform the steps of determining by the stub when the stub is executed whether the return address prediction was to the stub, and generating an indication of a return-oriented programming attack when the address return address prediction was not to the stub.

Implementations may include one or more of the following features. The one or more processors may be further configured to determine when the stub is executed whether the return address prediction was to the stub from indicia of a cache miss. The one or more processors may be further configured to respond to the indication of the return-oriented programming attack by at least one of coloring at least one of a file, a process, or an application with an indication of the return-oriented programming attack and updating a health status of a computing device in a communication to another device. The one or more processors may be further configured to respond to the indication of the return-oriented programming attack by initiating a root cause analysis on a computing device.

In a trampoline-based attack, a stack-based buffer overflow is used to overwrite a return address register with the address of an opcode causing a jump to malicious code. By instrumenting the operating system to detour system calls, and more specifically, memory-related calls such as changes to memory allocation or protection, through known stubs, the return addresses for these memory functions can be predictably and reliably controlled, which in turn permits detection of trampoline-based attacks seeking to indirectly modify memory protection or otherwise maliciously reconfigure program memory.

In an aspect, a computer program product for mitigating trampoline-based attacks may comprise computer executable code embodied in a non-transitory computer-readable medium that, when executing on one or more processors, performs the steps of providing a computing device executing an operating system with a user space and a system space, when a call for a memory function is made from a process executing in the user space into a kernel executing in the system space, detouring the call to a security process, in the security process, determining a predicted return address and a predicted ordinal for the call, performing a comparison of the predicted return address and the predicted ordinal to an actual return address and an actual ordinal for a function of the call, detecting a possible return-oriented programming attack when a mismatch is detected during the comparison, and returning control to a calling process that initiated the call to the function.

Implementations may include one or more of the following features. The predicted ordinal may include an identifier used by the computing device to correlate a name of a function in the call with an address of the function. The call may include a memory allocation function. The call may include a memory protection function.

In an aspect, a method may include providing a computing device executing an operating system with a user space and a system space, when a call is made from a process executing in the user space into a kernel executing in the system space, detouring the call to a security process, in the security process, determining a predicted return address and a predicted ordinal for the call, performing a comparison of the predicted return address and the predicted ordinal to an actual return address and an actual ordinal for a function of the call, and detecting a possible return-oriented programming attack based on a mismatch in the comparison.

Implementations may include one or more of the following features. The method may also include returning control to a calling process that initiated the call to the function. The predicted return address may include a return address where the call is predicted by the computing device to return control after completion of a called function. The predicted ordinal may include an identifier used by the computing device to correlate a name of a function in the call with an address of the function. The predicted ordinal may include an identifier used by the computing device to correlate a name of a function in the call with an address of the function. The method may also include providing a branch prediction in the security process, comparing the branch prediction to a branch taken during execution of instructions by the computing device, and detecting the possible return-oriented programming attack based upon detection of a second mismatch between the branch prediction and the branch taken. The call may invoke a function for handling a call from an application for a 32-bit processing environment within a 64-bit processing environment. The call may include a memory allocation function. The call may include a memory protection function. The call may remove data execution protection for a portion of a memory. The method may also include constructing an array of ordinals and expected stubs for a number of kernel functions, and accessing the array to look up the predicted ordinal for at least one function. The method may also include responding to the possible return-oriented programming attack by updating a health status of the computing device in a heartbeat generated by the computing device. The method may also include responding to the possible return-oriented programming attack by coloring at least one of a file, a process, or an application with an indication of the possible return-oriented programming attack. The method may also include responding to the possible return-oriented programming attack by initiating a root cause analysis on the computing device.

In an aspect, a system may include one or more processors executing an operating system with a user space and a system space, a memory for non-transitory storage of computer-readable data, and computer executable code stored in the memory and executable by the one or more processors to perform the steps of detouring a call from the user space into a kernel executing in the system space to a security process, determining a predicted return address and a predicted ordinal for the call in the security process, performing a comparison of the predicted return address and the predicted ordinal to an actual return address and an actual ordinal for a function of the call, and detecting a possible return-oriented programming attack when a mismatch is detected during the comparison.

Implementations may include one or more of the following features. The call may be a memory function call including one or more of a memory allocation function, a memory protection function, and a data execution protection function. The call may invoke a function for handling a call from an application for a 32-bit processing environment within a 64-bit processing environment.

In a return-oriented programming, a stack-based buffer overflow is used to overwrite a return address register with the address of a target selected by an attacker. A sequence of these return addresses may more generally execute relatively arbitrary sequences of instructions to obtain and exploit control of a computing device. While these attacks have characteristics amenable to detection and remediation, similar patterns may emerge during legitimate code execution. Described herein are techniques for improving a return-oriented programming attack mitigation system by suppressing false positive detections during execution of legitimate code.

In an aspect, a computer program product may comprise computer executable code embodied in a non-transitory computer readable medium that, when executing on one or more computing devices, suppresses false positive indications of return-oriented programming attacks by performing the steps of deploying a security measure to detect control-flow integrity compromises indicative of a return-oriented programming (ROP) exploit on a computing device, receiving a report of a possible ROP exploit from the security measure, the report including contextual information for the possible ROP exploit, where the contextual information further includes path information for one or more files associated with the possible ROP exploit and branch information for one or more processes associated with the possible ROP exploit, normalizing the report to isolate machine-specific variations in the path information and the branch information, hashing the report to provide a hashed report, pre-filtering the hashed report with a filter to determine if the hashed report contains a known false-positive for the possible ROP exploit, and responding to an indication of compromise when the report of the possible ROP exploit does not contain a known false-positive.

Implementations may include one or more of the following features. The security measure may detect the ROP exploit based on return address misprediction. The security measure may detect the ROP exploit based on branch misprediction. The security measure may detect the ROP exploit based on an indirect call or jump misprediction. The path information may be normalized according to a directory. The branch information may be normalized so that all addresses within the branch information are reported relative to a loaded module containing the branch. The filter may include a Bloom filter to determine whether the hashed report belongs to a collection of known false positive reports. The filter may include a crowd-sourced filter derived from reports of false positives received from a plurality of sources. The computer program product may further comprise code that performs the step of coloring a computing object associated with the possible ROP exploit to indicate that the computing object is not associated with the possible ROP exploit.

In an aspect, a method may include deploying a security measure to detect control-flow integrity compromises indicative of a return-oriented programming (ROP) exploit on a computing device, receiving a report of a possible ROP exploit from the security measure, the report including contextual information for the possible ROP exploit, where the contextual information further includes path information for one or more files associated with the possible ROP exploit and branch information for one or more processes associated with the possible ROP exploit, normalizing the report to isolate machine-specific variations in the path information and the branch information, hashing the report to provide a hashed report, pre-filtering the hashed report with a filter to determine if the hashed report contains a known false-positive for the possible ROP exploit, and responding to an indication of compromise when the report of the possible ROP exploit does not contain a known false-positive.

Implementations may include one or more of the following features. The security measure may detect the ROP exploit based on return address misprediction. The security measure may detect the ROP exploit based on branch misprediction. The security measure may detect the ROP exploit based on an indirect call or jump misprediction. The path information may be normalized according to a directory. The branch information may be normalized so that all addresses within the branch information are reported relative to a loaded module containing the branch. The filter may include a Bloom filter to determine whether the hashed report belongs to a collection of known false positive reports. The filter may include a crowd-sourced filter derived from reports of false positives received from a plurality of sources. The method may also include coloring a computing object associated with the possible ROP exploit to indicate that the computing object is not associated with the possible ROP exploit. The computing object may be at least one of a file, an application, and a process.

In an aspect, a system may include one or more processors executing an operating system with a user space and a system space, a memory for non-transitory storage of computer-readable data, and computer executable code stored in the memory and executable by the one or more processors to perform the steps of deploying a security measure to detect control-flow integrity compromises indicative of a return-oriented programming (ROP) exploit on a computing device, receiving a report of a possible ROP exploit from the security measure, the report including contextual information for the possible ROP exploit, where the contextual information further includes path information for one or more files associated with the possible ROP exploit and branch information for one or more processes associated with the possible ROP exploit, normalizing the report to isolate machine-specific variations in the path information and the branch information, hashing the report to provide a hashed report, pre-filtering the hashed report with a filter to determine if the hashed report contains a known false-positive for the possible ROP exploit, and responding to an indication of compromise when the report of the possible ROP exploit does not contain a known false-positive.

BRIEF DESCRIPTION OF THE FIGURES

The foregoing and other objects, features and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

FIG. 9 illustrates examples of identification of return-oriented programming attacks.

FIG. 14 shows an example of non-normalized and normalized branch information for a ROP exploit report.

DETAILED DESCRIPTION

Embodiments will now be described with reference to the accompanying figures, in which preferred embodiments are shown. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the embodiments.

In the following description, it is understood that terms such as "first," "second," "third," "above," "below," and the like, are words of convenience and are not to be construed as implying a chronological order or otherwise limiting any corresponding element unless expressly state otherwise.

Figure 1:
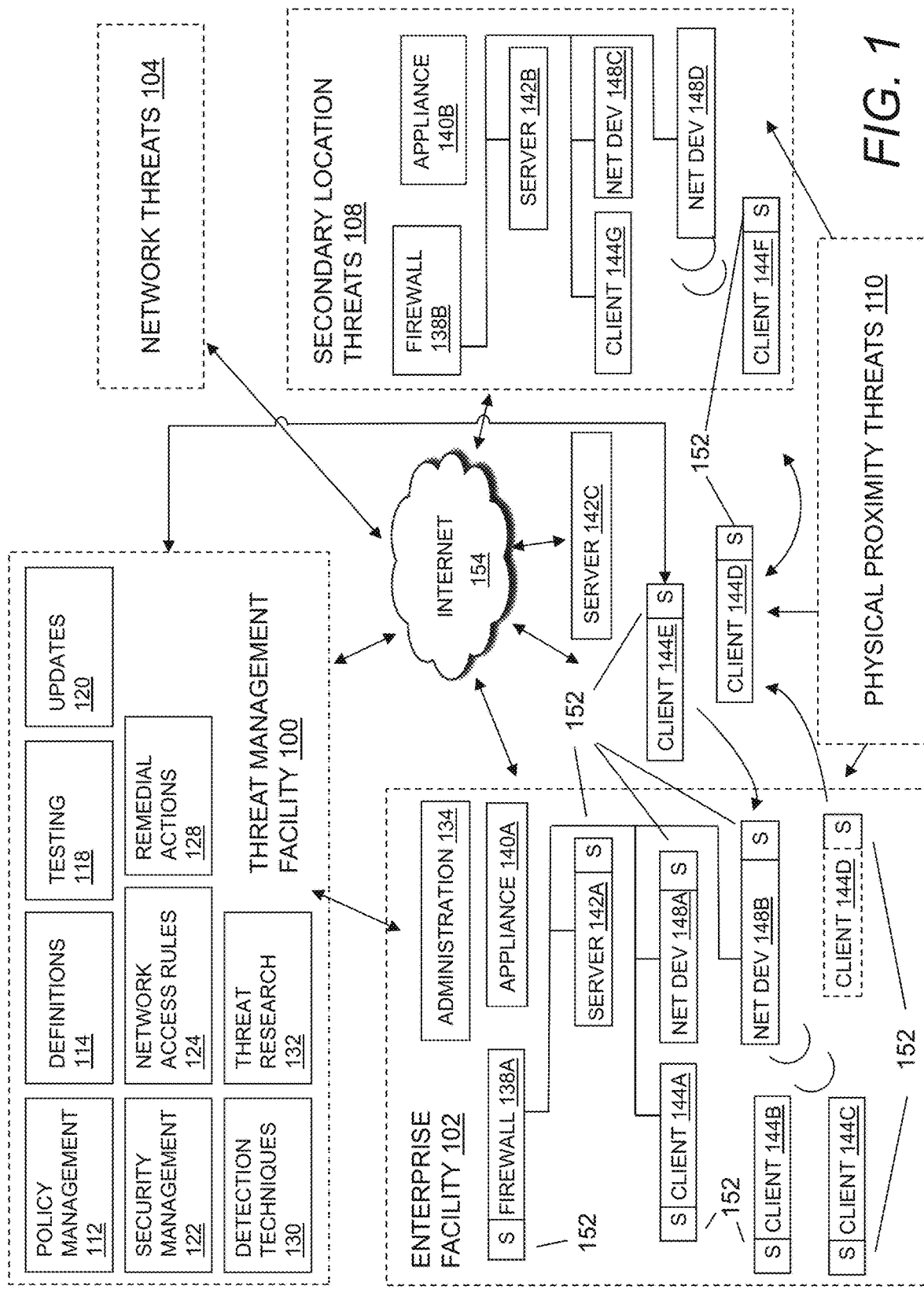
FIG. 1 illustrates an environment for threat management.

FIG. 1 illustrates an environment for threat management. Specifically, FIG. 1 depicts a block diagram of a threat management system providing protection to an enterprise against a plurality of threats—a context in which the following techniques may usefully be deployed. One aspect relates to corporate policy management and implementation through a unified threat management facility 100. A threat management facility 100 may be used to protect computer assets from computer-generated and user-generated threats. For example, a corporation or other entity may institute a policy that prevents certain people (e.g. employees, groups of employees, types of employees, guest of the corporation, etc.) from accessing certain types of computer programs. This policy may be created, deployed and managed through the threat management facility 100, which can update and monitor corporate computing assets accordingly.

The threat of malware may present at various points within a networked computing environment such as laptops, desktops, servers, gateways, communication ports, handheld or mobile devices, firewalls, and the like within an enterprise facility 102. In addition to stopping malicious code at these various loci, a threat management facility 100 may provide policy management to control legitimate applications that might otherwise undermine productivity and network performance within the enterprise facility 102.

The threat management facility 100 may provide protection to an enterprise facility 102 from computer-based malware, including viruses, spyware, adware, Trojans, intrusion, spam, policy abuse, advanced persistent threats, uncontrolled access, and the like. In general, the enterprise facility 102 may be any networked computer-based infrastructure or the like managed by a corporate entity, organization, association, institution, or the like. For example, the enterprise facility 102 may be a corporate, commercial, educational, governmental, or other network infrastructure or the like, and a computer network infrastructure for the enterprise facility 102 may be distributed amongst a plurality of networks, computing resources, and other facilities, and in a plurality of geographical locations, and may include administration 134, a firewall 138A, an appliance 140A, a server 142A, network devices 148A-B, clients 144A-D, such as devices protected by computer security facilities 152, and the like. It will be understood that any reference herein to a client or client facilities may include the clients 144A-D shown in FIG. 1 and vice-versa.

The threat management facility 100 may include computers, software, or other computing facilities supporting a plurality of functions, such as security management facility 122, a policy management facility 112, an update facility 120, a definitions facility 114, a network access rules facility 124, a remedial action facility 128, a detection techniques facility 130, a testing facility 118, a threat research facility 132, and the like. In embodiments, the threat protection provided by the threat management facility 100 may extend beyond the network boundaries of the enterprise facility 102 to include clients 144D (or client facilities) that have moved into network connectivity not directly associated with or controlled by the enterprise facility 102. Threats to client facilities may come from a plurality of sources, such as from network threats 104, physical proximity threats 110, secondary location threats 108, and the like. Clients 144A-D may be protected from threats even when the client 144A-D is not located in association with the enterprise 102, such as when a client 144E-F moves in and out of the enterprise facility 102, for example when interfacing with an unprotected server 142C through the Internet 154, when a client 144F is moving into a secondary location threat 108 such as interfacing with components 140B, 142B, 148C, 148D that are not protected, and the like. The threat management facility 100 may use an integrated system approach to provide an enterprise facility 102 protection from a plurality of threats to multiplatform computer resources in a plurality of locations and network configurations. The threat management facility 100 may also or instead be deployed as a stand-alone solution. In other embodiments, the threat management facility 100 may be integrated into a third-party product, e.g., through an application programming interface (e.g., a source code interface), which may be deployed on endpoints, on a remote server, on an internal server or gateway for an enterprise, or some combination of these.

The security management facility 122 may include a plurality of elements that provide protection from malware to enterprise facility 102 computer resources in a variety of ways including endpoint security and control, email security and control, web security and control, reputation-based filtering, control of unauthorized users, control of guest and non-compliant computers, and the like. The security management facility 122 may include a local software application that provides protection to a client facility computing resource. The security management facility 122 may have the ability to scan the client facility files for malicious code, remove or quarantine certain applications and files, prevent certain actions, perform remedial actions and perform other security measures. This may include scanning some or all of the files stored to the client facility on a periodic basis, scanning an application when the application is executed, scanning files as the files are transmitted to or from the client facility, or the like. The scanning of the applications and files may be performed to detect known malicious code or known unwanted applications.

The security management facility 122 may provide email security and control. The security management facility 122 may also or instead provide for web security and control, such as by helping to detect or block viruses, spyware, malware, unwanted applications, and the like, or by helping to control web browsing activity originating from client devices. In an embodiment, the security management facility 122 may provide for network access control, which may provide control over network connections. In addition, network access control may control access to virtual private networks (VPN) that provide communications networks tunneled through other networks. The security management facility 122 may provide host intrusion prevention through behavioral based protection, which may guard against unknown threats by analyzing behavior before software code executes. The security management facility 122 may provide reputation filtering, which may target or identify sources of known malware.

In general, the security management facility 122 may support overall security of the enterprise facility 102 network or set of enterprise facility 102 networks using the various techniques described above, as supplemented by updates of malicious code information and so forth for distribution across the enterprise facility 102 and associated client devices. The administration facility 134 may provide control over the security management facility 122 when updates are performed. Information from the security management facility 122 may also be sent from the enterprise back to a third party, a vendor, or the like, which may lead to improved performance of the threat management facility 100.

The threat management facility 100 may include a policy management facility 112 configured to block non-malicious applications under appropriate circumstances. The policy management facility 112 may employ a set of rules or policies that indicate enterprise facility 102 access permissions for the client facility. In an embodiment, a policy database may be a block list, a black list, an allowed list, a white list, or the like, or combinations of the foregoing, that may provide a list of resources external to the enterprise facility 102 that may or may not be accessed by managed client devices. The policy management facility 112 may also or instead use rule-based filtering of access requests, or any other suitable techniques for controlling access to external resources consistent with a corresponding enterprise policy.

The threat management facility 100 may also or instead provide configuration management to examine and control the configuration of applications, operating systems, hardware, and the like for managed devices within the enterprise facility 102. Threat management against a quickly evolving malware environment may require timely updates, and thus an update management facility 120 may also be provided by the threat management facility 100. In addition, a policy management facility 112 may require update management (e.g., as provided by the update facility 120 herein described). In embodiments, the threat management facility 100 may provide for patch management or other software updating, version control, and so forth.

The security facility 122 and policy management facility 112 may push information to the enterprise facility 102 network and/or client facility. The enterprise facility 102 network and/or client facility may also or instead pull information from the security facility 122 and policy management facility 112 network server facilities 142, or there may be a combination of pushing and pulling of information. In an embodiment, the policy management facility 112 and the security facility 122 management update modules may work in concert to provide information to the enterprise facility's 102 network and/or client facility for control of application execution.

As threats are identified and characterized, the threat management facility 100 may create definition updates that may be used to allow the threat management facility 100 to detect and remediate the latest malicious software, unwanted applications, configuration and policy changes, and the like. The threat definition facility 114 may contain threat identification updates, also referred to as definition files. A definition file may be a virus identity file that may include definitions of known or potential malicious code. The virus identity (IDE) definition files may provide information that may identify malicious code within files, applications, or the like. The definition files may be accessed by security management facility 122 when scanning files or applications within the client facility for the determination of malicious code that may be within the file or application. A definition management facility 114 may provide timely updates of definition files information to the network, client facilities, and the like.

In a similar manner, the security management facility 122 may be used to scan an outgoing file and verify that the outgoing file is permitted to be transmitted per the enterprise facility 102 rules and policies. By checking outgoing files, the security management facility 122 may be able to discover malicious code infected files that were not detected as incoming files.

The threat management facility 100 may provide controlled access to the enterprise facility 102 networks. A network access rules facility 124 may be responsible for determining if a client facility application should be granted access to a requested network location. In an embodiment, the network access rules facility 124 may verify access rights for client facilities from within the network or may verify access rights of computer facilities from external networks. When network access for a client facility is denied, the network access rules facility 124 may send an information file to the client facility, e.g., a command or command file that the remedial action facility 128 may access and take action upon. The network access rules facility 124 may include databases such as a block list, a black list, an allowed list, a white list, an unacceptable network site database, an acceptable network site database, a network site reputation database, or the like of network access locations that may or may not be accessed by the client facility. Additionally, the network access rules facility 124 may incorporate rule evaluation. Rule evaluation may, for example, parse network access requests and apply the parsed information to network access rules. The network access rule facility 124 may also or instead provide updated rules and policies to the enterprise facility 102.

When a threat or policy violation is detected by the threat management facility 100, the threat management facility 100 may perform or initiate remedial action through a remedial action facility 128. Remedial action may take a plurality of forms, such as terminating or modifying an ongoing process or interaction, sending a warning to a client or administration facility 134 of an ongoing process or interaction, executing a program or application to remediate against a threat or violation, record interactions for subsequent evaluation, and so forth. The remedial action may be one or more of continuing to block all requests to a denied network location, performing a malicious code scan on the application, performing a malicious code scan on the client facility, quarantining a related application (or files, processes or the like), terminating the application, isolating the application, moving a process or application code to a sandbox for evaluation, isolating the client facility to a location within the network that restricts network access, blocking a network access port from a client facility, reporting the application to an administration facility 134, or the like, as well as any combination of the foregoing.

Remedial action may be provided as a result of a detection of a threat or violation. The detection techniques facility 130 may include tools for monitoring the network or managed devices within the enterprise facility 102. The detection techniques facility 130 may provide functions such as monitoring activity and stored files on computing facilities. Detection techniques, such as scanning a computer's stored files, may provide the capability of checking files for stored threats, either in the active or passive state. Detection techniques such as streaming file management may be used to check files received at the network, a gateway facility, a client facility, and the like.

Verifying that the threat management facility 100 is detecting threats and violations to established policy, may require the ability to test the system, either at the system level or for a particular computing component. The testing facility 118 may allow the administration facility 134 to coordinate the testing of the security configurations of client facility computing facilities on a network. For example, the administration facility 134 may be able to send test files to a set of client facility computing facilities to test the ability of the client facility to determine acceptability of the test file. After the test file has been transmitted, a recording facility may record the actions taken by the client facility in reaction to the test file. The recording facility may aggregate the testing information from the client facility and report the testing information to the administration facility 134. The administration facility 134 may be able to determine the level of preparedness of the client facility computing facilities based on the reported information. Remedial action may be taken for any of the client facility computing facilities as determined by the administration facility 134.

The threat management facility 100 may provide threat protection across the enterprise facility 102 to managed resources such as clients, a server facility 142, an administration facility 134, a firewall 138, a gateway, one or more hubs and routers 148, a threat management appliance 140, any number of desktop or mobile users, and the like. As used herein the term endpoint may refer to any computer system that can source data, receive data, evaluate data, buffer data, process data or the like (such as a user's desktop computer). This may, for example, include any client devices as well as other network devices and the like within the enterprise facility 102, such as a firewall (as a data evaluation endpoint computer system), a laptop (as a mobile endpoint computer), a tablet (as a hand-held endpoint computer), a mobile phone, or the like. The term endpoint may also or instead refer to any final or intermediate source or destination for data within a network. The endpoint computer security facility 152 may be an application locally loaded onto any corresponding computer platform or computer support component, either for local security functions or for management by the threat management facility 100 or other remote resource, or any combination of these.

The enterprise facility 102 may include a plurality of client facility computing platforms on which the endpoint computer security facility 152 is installed. A client facility computing platform may be a computer system that is able to access a service on another computer, such as a server facility 142, via a network. The endpoint computer security facility 152 may, in corresponding fashion, provide security in any suitable context such as among a plurality of networked applications, for a client facility connecting to an enterprise facility 102 application server facility 142, for a web browser client facility connecting to a web server facility 142, for an e-mail client facility retrieving e-mail from an Internet 154 service provider's mail storage servers 142, and the like, as well as any combination of the foregoing.

The enterprise facility 102 may include a plurality of server facilities 142, such as application servers, communications servers, file servers, database servers, proxy servers, mail servers, fax servers, game servers, web servers, and the like. A server facility 142, which may also be referred to as a server facility 142 application, server facility 142 operating system, server facility 142 computer, or the like, may be any device(s), application program(s), operating system(s), or combination of the foregoing that accepts client facility connections in order to service requests from clients 144. In embodiments, the threat management facility 100 may provide threat protection to server facilities 142 within the enterprise facility 102 as load conditions and application changes are made.

A server facility 142 may include an appliance facility 140, where the appliance facility 140 provides specific services to other devices on the network. Simple server facility 142 appliances may also be utilized across the enterprise facility's 102 network infrastructure, such as switches, routers, hubs, gateways, print servers, modems, and the like. These appliances may provide interconnection services within the enterprise facility 102 network, and therefore may advance the spread of a threat if not properly protected.

A client facility may be protected from threats from within the enterprise facility 102 network using a personal firewall, which may be a hardware firewall, software firewall, or combination of these, that controls network traffic to and from a client. The personal firewall may permit or deny communications based on a security policy. Another component that may be protected by an endpoint computer security facility 152 is a network firewall facility 138, which may include hardware or software, in a standalone device or integrated into another network component, that may be configured to permit, deny, or proxy data through a computer network that has different levels of trust in its source of data.

The interface between the threat management facility 100 and the enterprise facility 102, and through the appliance facility 140 to embedded endpoint computer security facilities, may include a set of tools that may be the same for all enterprise implementations, but allow each enterprise to implement different controls. In embodiments, these controls may include both automatic actions and managed actions. The administration facility 134 may configure policy rules that determine interactions. The administration facility 134 may also establish license management, which in turn may further determine interactions associated with licensed applications. In embodiments, interactions between the threat management facility 100 and the enterprise facility 102 may provide threat protection to the enterprise facility 102 by managing the flow of network data into and out of the enterprise facility 102 through automatic actions that may be configured by the threat management facility 100 or the administration facility 134.

Client facilities within the enterprise facility 102 may be connected to the enterprise facility 102 network by way of wired network facilities 148A or wireless network facilities 148B. Mobile wireless facility clients 144B-F, because of their ability to connect to any wireless network access point, may connect to the Internet 154 outside the enterprise facility 102, and therefore outside the threat-protected environment of the enterprise facility 102. In this instance, the mobile client facility (e.g., the clients 144 B-F), if not for the presence of a locally-installed endpoint computer security facility 152, may be exposed to a malware attack or perform actions counter to enterprise facility 102 established policies. Thus, the endpoint computer security facility 152 may provide local protection against various threats and policy violations. The threat management facility 100 may also or instead be configured to protect the out-of-enterprise facility 102 mobile client facility (e.g., the clients 144 D-F) through interactions over the Internet 154 (or other network) with the locally-installed endpoint computer security facility 152. Thus, mobile client facilities that are components of the enterprise facility 102 but temporarily outside connectivity with the enterprise facility 102 network may be provided with the threat protection and policy control the same as or similar to client facilities inside the enterprise facility 102. In addition, mobile the client facilities may receive the same interactions to and from the threat management facility 100 as client facilities inside the enterprise facility 102, such as by receiving the same or equivalent services via an embedded endpoint computer security facility 152.

Interactions between the threat management facility 100 and the components of the enterprise facility 102, including mobile client facility extensions of the enterprise facility 102, may ultimately be connected through the Internet 154 or any other network or combination of networks. Security-related or policy-related downloads and upgrades to the enterprise facility 102 may be passed from the firewalled networks of the threat management facility 100 through to components of the enterprise facility 102 equipped with the endpoint computer security facility 152. In turn, the endpoint computer security facility 152 components of the enterprise facility 102 may upload policy and access requests back across the Internet 154 and through to the threat management facility 100. The Internet 154 however, is also the path through which threats may be transmitted from their source, and an endpoint computer security facility 152 may be configured to protect a device outside the enterprise facility 102 through locally-deployed protective measures and through suitable interactions with the threat management facility 100.

Thus, if the mobile client facility were to attempt to connect into an unprotected connection point, such as at a secondary location 108 that is not a part of the enterprise facility 102, the mobile client facility may be required to request network interactions through the threat management facility 100, where contacting the threat management facility 100 may be performed prior to any other network action. In embodiments, the client facility's 144 endpoint computer security facility 152 may manage actions in unprotected network environments such as when the client facility (e.g., client 144F) is in a secondary location 108, where the endpoint computer security facility 152 may dictate what actions are allowed, blocked, modified, or the like.

The secondary location 108 may have no endpoint computer security facilities 152 as a part of its computer components, such as its firewalls 138B, servers 142B, clients 144G, hubs and routers 148C-D, and the like. As a result, the computer components of the secondary location 108 may be open to threat attacks, and become potential sources of threats, as well as any mobile enterprise facility clients 144B-F that may be connected to the secondary location's 108 network. In this instance, these computer components may now unknowingly spread a threat to other components connected to the network.

Some threats do not come directly from the Internet 154. For example, a physical proximity threat 110 may be deployed on a client device while that device is connected to an unprotected network connection outside the enterprise facility 102, and when the device is subsequently connected to the enterprise facility 102 client facility, the device can deploy the malware or otherwise pose a threat. In embodiments, the endpoint computer security facility 152 may protect the enterprise facility 102 against these types of physical proximity threats 110, for instance, through scanning any device prior to allowing data transfers, through security validation certificates, through establishing a safe zone within the enterprise facility 102 computing resource to receive data for evaluation, and the like.

Having provided an overall context for threat detection, the description now turns to a brief discussion of an example of a computer system that may be used for any of the entities and facilities described above.

Figure 2:
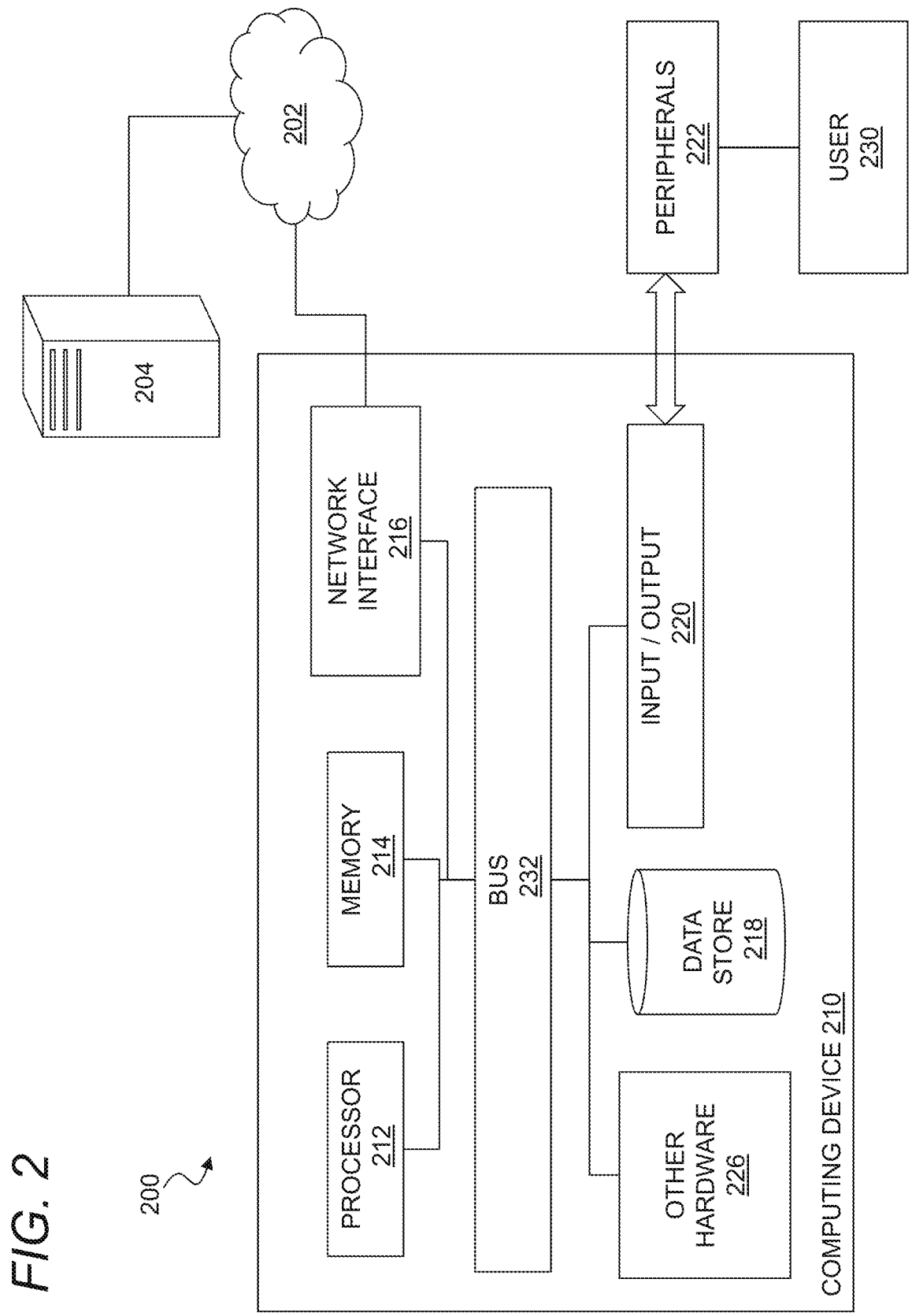
FIG. 2 illustrates a computer system.

FIG. 2 illustrates a computer system. In general, the computer system 200 may include a computing device 210 connected to a network 202, e.g., through an external device 204. The computing device 210 may be or include any type of network endpoint or endpoints as described herein, e.g., with reference to FIG. 1 above. For example, the computing device 210 may include a desktop computer workstation. The computing device 210 may also or instead be any other device that has a processor and communicates over a network 202, including without limitation a laptop computer, a desktop computer, a personal digital assistant, a tablet, a mobile phone, a television, a set top box, a wearable computer (e.g., watch, jewelry, or clothing), a home device (e.g., a thermostat, humidistat, appliance or a home appliance controller), just as some examples. The computing device 210 may also or instead include a server, or it may be disposed on a server or within a virtual or physical server farm.

The computing device 210 may be any of the entities in the threat management environment described above with reference to FIG. 1. For example, the computing device 210 may be a server, a client an enterprise facility, a threat management facility, or any of the other facilities or computing devices described therein. In certain aspects, the computing device 210 may be implemented using hardware (e.g., in a desktop computer), software (e.g., in a virtual machine or the like), or a combination of software and hardware (e.g., with programs executing on the desktop computer), and the computing device 210 may be a stand-alone device, a device integrated into another entity or device, a platform distributed across multiple entities, or a virtualized device executing in a virtualization environment.

The network 202 may include any network or combination of networks, such as one or more data networks or internetworks suitable for communicating data and control information among participants in the computer system 200. The network 202 may include public networks such as the Internet, private networks, and telecommunications networks such as the Public Switched Telephone Network or cellular networks using third generation cellular technology (e.g., 3G or IMT-2000), fourth generation cellular technology (e.g., 4G, LTE. MT-Advanced, E-UTRA, etc.) or WiMax-Advanced (IEEE 802.16m)) and/or other technologies, as well as any of a variety of corporate area, metropolitan area, campus or other local area networks or enterprise networks, along with any switches, routers, hubs, gateways, and the like that might be used to carry data among participants in the computer system 200. The network 202 may also include a combination of data networks, and need not be limited to a strictly public or private network.

The external device 204 may be any computer or other remote resource that connects to the computing device 210 through the network 202. This may include threat management resources such as any of those contemplated above, gateways or other network devices, remote servers or the like containing content requested by the computing device 210, a network storage device or resource, a device hosting content, or any other resource or device that might connect to the computing device 210 through the network 202.

The computing device 210 may include a processor 212, a memory 214, a network interface 216, a data store 218, and one or more input/output devices 220. The computing device 210 may further include or be in communication with one or more peripherals 222 and other external input/output devices 224.

The processor 212 may be any as described herein, and in general may be capable of processing instructions for execution within the computing device 210 or computer system 200. The processor 212 may include a single-threaded processor, a multi-threaded processor, a multi-core processor, or any other processor, processing circuitry, or combination of the foregoing suitable for processing data and instructions as contemplated herein. The processor 212 may be capable of processing instructions stored in the memory 214 or on the data store 218.

The memory 214 may store information within the computing device 210 or computer system 200. The memory 214 may include any volatile or non-volatile memory or other computer-readable medium, including without limitation a Random-Access Memory (RAM), a flash memory, a Read Only Memory (ROM), a Programmable Read-only Memory (PROM), an Erasable PROM (EPROM), registers, and so forth. The memory 214 may store program instructions, program data, executables, and other software and data useful for controlling operation of the computing device 200 and configuring the computing device 200 to perform functions for a user. The memory 214 may include a number of different stages and types for different aspects of operation of the computing device 210. For example, a processor may include on-board memory and/or cache for faster access to certain data or instructions, and a separate, main memory or the like may be included to expand memory capacity as desired.

The memory 214 may, in general, include a non-volatile computer readable medium containing computer code that, when executed by the computing device 200 creates an execution environment for a computer program in question, e.g., code that constitutes processor firmware, a protocol stack, a database management system, an operating system, or a combination of the foregoing, and/or code that performs some or all of the steps set forth in the various flow charts and other algorithmic descriptions set forth herein. While a single memory 214 is depicted, it will be understood that any number of memories may be usefully incorporated into the computing device 210. For example, a first memory may provide non-volatile storage such as a disk drive for permanent or long-term storage of files and code even when the computing device 210 is powered down. A second memory such as a random-access memory may provide volatile (but higher speed) memory for storing instructions and data for executing processes. A third memory may be used to improve performance by providing even higher speed memory physically adjacent to the processor 212 for registers, caching and so forth.

The network interface 216 may include any hardware and/or software for connecting the computing device 210 in a communicating relationship with other resources through the network 202. This may include connections to resources such as remote resources accessible through the Internet, as well as local resources available using short range communications protocols using, e.g., physical connections (e.g., Ethernet), radio frequency communications (e.g., WiFi), optical communications, (e.g., fiber optics, infrared, or the like), ultrasonic communications, or any combination of these or other media that might be used to carry data between the computing device 210 and other devices. The network interface 216 may, for example, include a router, a modem, a network card, an infrared transceiver, a radio frequency (RF) transceiver, a near field communications interface, a radio-frequency identification (RFID) tag reader, or any other data reading or writing resource or the like.

More generally, the network interface 216 may include any combination of hardware and software suitable for coupling the components of the computing device 210 to other computing or communications resources. By way of example and not limitation, this may include electronics for a wired or wireless Ethernet connection operating according to the IEEE 802.11 standard (or any variation thereof), or any other short or long range wireless networking components or the like. This may also or instead include hardware for short range data communications such as Bluetooth or an infrared transceiver, which may be used to couple to other local devices, or to connect to a local area network or the like that is in turn coupled to a data network 202 such as the Internet. This may also or instead include hardware/software for a WiMax connection or a cellular network connection (using, e.g., CDMA, GSM, LTE, or any other suitable protocol or combination of protocols). The network interface 216 may be included as part of the input/output devices 220 or vice-versa.

The data store 218 may be any internal memory store providing a computer-readable medium such as a disk drive, an optical drive, a magnetic drive, a flash drive, or other device capable of providing mass storage for the computing device 210. The data store 218 may store computer readable instructions, data structures, program modules, and other data for the computing device 210 or computer system 200 in a non-volatile form for subsequent retrieval and use. The data store 218 may store computer executable code for an operating system, application programs, and other program modules, software objects, libraries, executables, and the like the like. The data store 218 may also store program data, databases, files, media, and so forth.

The input/output interface 220 may support input from and output to other devices that might couple to the computing device 210. This may, for example, include serial ports (e.g., RS-232 ports), universal serial bus (USB) ports, optical ports, Ethernet ports, telephone ports, audio jacks, component audio/video inputs, HDMI ports, and so forth, any of which might be used to form wired connections to other local devices. This may also or instead include an infrared interface, RF interface, magnetic card reader, or other input/output system for coupling in a communicating relationship with other local devices. It will be understood that, while the network interface 216 for network communications is described separately from the input/output interface 220 for local device communications, these two interfaces may be the same, or may share functionality, such as where a USB port is used to attach to a WiFi accessory or other network interfacing device, or where an Ethernet connection is used to couple to a local network attached storage.

The peripherals 222 may include any device or combination of devices used to provide information to or receive information from the computing device 200. This may include human input/output (I/O) devices such as a keyboard, a mouse, a mouse pad, a track ball, a joystick, a microphone, a foot pedal, a camera, a touch screen, a scanner, or other device that might be employed by the user 230 to provide input to the computing device 210. This may also or instead include a display, a speaker, a printer, a projector, a headset or any other audiovisual device for presenting information to a user or otherwise providing machine-usable or human-usable output from the computing device 210. The peripheral 222 may also or instead include a digital signal processing device, an actuator, or other device to support control of or communication with other devices or components. Other I/O devices suitable for use as a peripheral 222 include haptic devices, three-dimensional rendering systems, augmented-reality displays, magnetic card readers, three-dimensional printers, computer-numerical controlled manufacturing machines and so forth. In one aspect, the peripheral 222 may serve as the network interface 216, such as with a USB device configured to provide communications via short range (e.g., Bluetooth, WiFi, Infrared, RF, or the like) or long range (e.g., cellular data or WiMax) communications protocols. In another aspect, the peripheral 222 may provide a device to augment operation of the computing device 210, such as a global positioning system (GPS) device, a security dongle, a projector, or the like. In another aspect, the peripheral may be a storage device such as a flash card, USB drive, or other solid-state device, or an optical drive, a magnetic drive, a disk drive, or other device or combination of devices suitable for bulk storage. More generally, any device or combination of devices suitable for use with the computing device 200 may be used as a peripheral 222 as contemplated herein.

Other hardware 226 may be incorporated into the computing device 200 such as a co-processor, a digital signal processing system, a math co-processor, a graphics engine, a video driver, and so forth. The other hardware 226 may also or instead include expanded input/output ports, extra memory, additional drives (e.g., a DVD drive or other accessory), and so forth.

A bus 232 or combination of busses may serve as an electromechanical platform for interconnecting components of the computing device 200 such as the processor 212, memory 214, network interface 216, other hardware 226, data store 218, and input/output interface. As shown in the figure, each of the components of the computing device 210 may be interconnected using a system bus 232 or other communication mechanism for communicating information.

Methods and systems described herein can be realized using the processor 212 of the computer system 200 to execute one or more sequences of instructions contained in the memory 214 to perform predetermined tasks. In embodiments, the computing device 200 may be deployed as a number of parallel processors synchronized to execute code together for improved performance, or the computing device 200 may be realized in a virtualized environment where software on a hypervisor or other virtualization management facility emulates components of the computing device 200 as appropriate to reproduce some or all of the functions of a hardware instantiation of the computing device 200.

Figure 3:
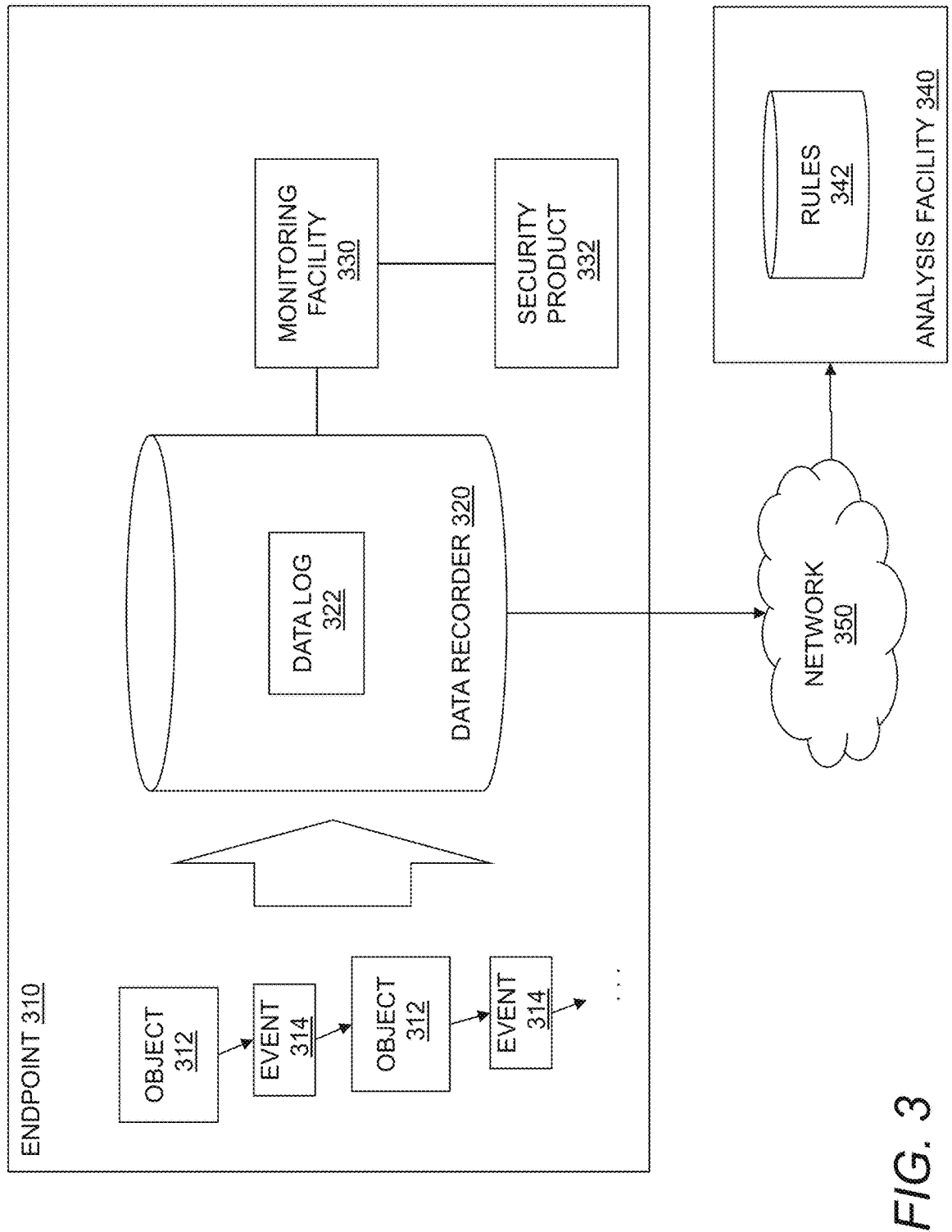
FIG. 3 illustrates a system for forensic analysis for computer processes.
Figure 4:
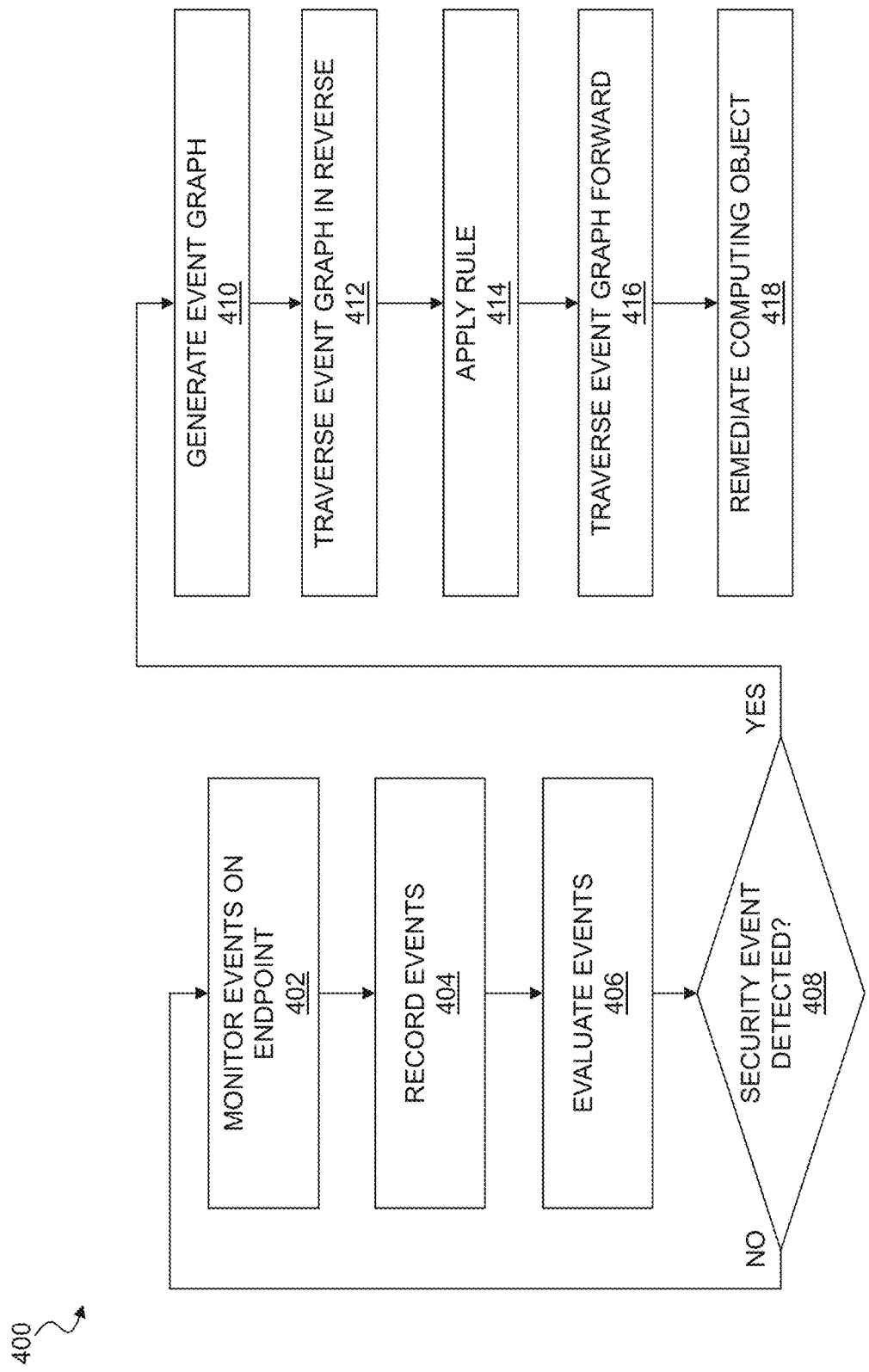
FIG. 4 is a flowchart of a method for forensic analysis for computer processes.
Figure 5:
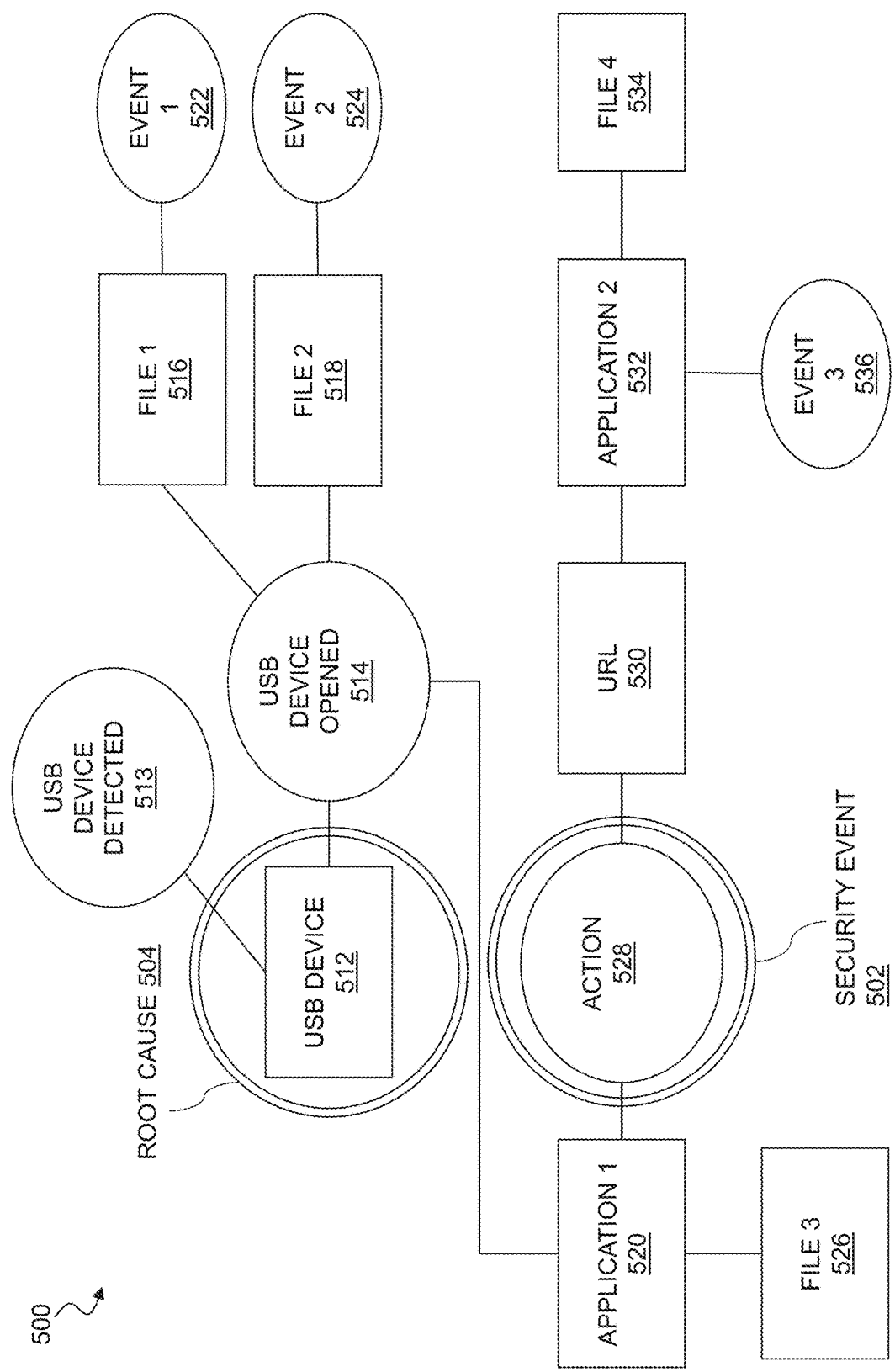
FIG. 5 illustrates an event graph.

FIGS. 3-5 generally describe a forensic analysis platform that may be usefully integrated with the other systems and methods disclosed herein.

FIG. 3 illustrates a system for forensic analysis for computer processes. The system 300 may include an endpoint 310 containing a data recorder 320, a monitoring facility 330, and any number of objects 312 and events 314. An analysis facility 340 may be coupled in a communicating relationship with the endpoint 310 over a data network 350 such as any of the networks described above. It will be appreciated that, while illustrated as components of the endpoint 310, certain components of the system 300 such as the data recorder 320 and the monitoring facility 330 and the analysis facility may also or instead be realized as remote services instantiated on a virtual appliance, a public or private cloud, or the like, any of which may be coupled to the endpoint 310 through the data network 350 or another communication channel (not shown). Each of the components of the system 300 may be configured with suitable programming and configuration to participate in the various forensic techniques, threat detection techniques, and security management techniques contemplated herein.

The endpoint 310 may be any of the endpoints described herein, e.g., a computing device in an enterprise network, or any other device or network asset that might join or participate in an enterprise or otherwise operate on an enterprise network. This may, for example, include a server, a client device such as a desktop computer or a mobile computing device (e.g., a laptop computer or a tablet), a cellular phone, a smart phone, or other computing device suitable for participating in the system 300 or in an enterprise.

In general, the endpoint 310 may include any number of computing objects 312, which may for example, be processes executed by one or more processors or other processing circuitry, files or data stored in memory, or any other computing objects described herein. While the term object has a number of specific meanings in the art, and in particular in object-oriented programming, it will be understood that the term 'object' as used herein is intended to be significantly broader, and may include any data, process, file or combination of these including without limitation any process, application, executable, script, dynamic linked library (DLL), file, data, database, data source, data structure, function, resource locator (e.g., uniform resource locator (URL) or other uniform resource identifier (URI)), or the like that might be resident on the endpoint 310 and manipulated by the endpoint 310 or another component of the system 300 or other systems described elsewhere herein. The object 312 may also or instead include a remote resource, such as a resource identified in a URL. That is, while the object 312 in the figure is depicted as residing on the endpoint 310, an object 312 may also reside elsewhere in the system 300, for example with a link, pointer, or reference.

The object 312 may be an item that is performing an action or causing an event 314, or the object 312 may be an item that is receiving the action or is the result of an event 314 (e.g., the object 312 may be an item in the system 300 being acted upon by an event 314 or another object 312). In general, an event 314 as contemplated herein may be any data flow, execution flow, control flow, network flow, or other similar action or event that might causally relate objects 312 to one another. Where the object 312 is data or includes data, the object 312 may be encrypted or otherwise protected, or the object 312 may be unencrypted or otherwise unprotected. The object 312 may be a process or other computing object that performs an action, which may include a single event 314 or a collection or sequence of events 314 taken by a process. The object 312 may also or instead include an item such as a file or lines of code that are executable to perform such actions. The object 312 may also or instead include a computing component upon which an action is taken, e.g., a system setting (e.g., a registry key or the like), a data file, a URL, and so forth. The object 312 may exhibit a behavior such as an interaction with another object or a component of the system 300.

Objects 312 may be described in terms of persistence. The object 312 may, for example, be a part of a process, and remain persistent as long as that process is alive. The object 312 may instead be persistent across an endpoint 310 and remain persistent as long as an endpoint 310 is active or alive. The object 312 may instead be a global object having persistence outside of an endpoint 310, such as a URL or a data store. In other words, the object 312 may be a persistent object with persistence outside of the endpoint 310.

Although many if not most objects 312 will typically be benign objects forming a normal part of the computing environment for an operating endpoint 310, an object 312 may contain software associated with an advanced persistent threat (APT) or other malware that resides partially or entirely on the endpoint 310. This associated software may have reached the endpoint 310 in a variety of ways, and may have been placed manually or automatically on the endpoint 310 by a malicious source. It will be understood that the associated software may take any number of forms and have any number of components. For example, the associated software may include an executable file that can execute independently, or the associated software may be a macro, plug-in, or the like that executes within another application. Similarly, the associated software may manifest as one or more processes or threads executing on the endpoint 310. Further, the associated software may install from a file on the endpoint 310 (or a file remote from the endpoint 310), and the associated software may create one or more files such as data files or the like while executing. Associated software should be understood to generally include all such files and processes except where a specific file or process is more specifically noted.

An event 314 may include an action, a behavior, an interaction, and so forth. The event 314 may be generated by or otherwise related to an object 312. For example, the event 314 may be associated with a file and include an action such as a read, a write, an open, a move, a copy, a delete, and so forth. The event 314 may also or instead include an interprocess communication, e.g., a create, a handle, a debug, a remote injection, and so forth. The event 314 may also or instead include accessing an Internet Protocol (IP) address or URL.

The data recorder 320 may monitor and record activity related to the objects 312 and events 314 occurring on the endpoint 310. The activity of the endpoint 310 may be stored in a data log 322 or the like on the data recorder 320, which may be stored locally on the endpoint 310 (as depicted) or remotely at a threat management resource, or some combination of these, such as where the data log 322 is periodically transmitted to a remote facility for archiving or analysis. The data recorder 320 may continuously record any activity occurring on the endpoint 310 for predetermined periods of time before overwriting previously recorded data. Thus, the data log 322 may include a continuous data feed of events 314. When an event 314 is detected that is a beacon or trigger event (such as a file detection, a malicious traffic detection, or the like), the data log 322 may be saved and transmitted to an analysis facility 340 or the like for analysis, e.g., to determine a root cause of the beacon or trigger event. The data log 322 may be used to create an event graph or other snapshot of the activity on the endpoint 310, e.g., for a period of time surrounding a beacon or trigger event. The beacon or trigger event may be detected locally by the monitoring facility 330, or remotely by a remote threat management facility or the like, or some combination of these.

While illustrated on the endpoint 310, it will be understood that the data recorder 320 may also or instead be implemented at a remote location such as a threat management facility or other enterprise network security resource. The data recorder 320 may be provisioned on the same or a different device than a data store in which data is stored. The data recorder 320 may be configured to record data as efficiently as possible so as to minimize impact on the endpoint 310.

The monitoring facility 330 may work in conjunction with the data recorder 320 to instrument the endpoint 310 so that any observable events 314 by or involving various objects 312 can be monitored and recorded. It will be appreciated that various filtering rules and techniques may be used to synopsize, summarize, filter, compress or otherwise process information captured by the data recorder 320 to help ensure that relevant information is captured while maintaining practical limits on the amount of information that is gathered.

A security product 332 may execute on the endpoint 310 to detect a security event on the endpoint 310, which may act as the beacon or trigger event for the system 300. The security product 332 may use techniques such as signaturebased and behavioral-based malware detection including without limitation one or more of host intrusion prevention, malicious traffic detection, URL blocking, file-based detection, and so forth.

The beacon or trigger event on the endpoint 310 may be a fully qualified (e.g., definitive) detection of a compromise or other malicious activity. In another aspect, the beacon or trigger event on the endpoint 310 may be a suspicious behavior that is suspicious but not confirmed as malicious. For example, the beacon or trigger event on the endpoint 310 may signal an unusual behavior that is known to commonly appear concurrently with the detection of malware. In an aspect, when the beacon or trigger event is a suspicious behavior, the data log 322 may be analyzed differently than when the beacon or trigger event is a confirmed malicious behavior. For example, the data log 322 may be sent to a different component of the system 300 through the network, e.g., to a different analysis facility 340.

The monitoring facility 330 may be disposed remotely from the endpoint 310 or analysis facility 340. The monitoring facility 330 may be included on one or more of the endpoint 310 or analysis facility 340. In an aspect, the monitoring facility 330 and the analysis facility 340 included in the same component.

The analysis facility 340 may analyze the data log 322, e.g., as part of a root cause analysis and to identify objects 312 compromised by the root cause. To this end, the analysis facility 340 may utilize one or more rules 342 for applying to the data included in the data log 322 to determine a root cause of a beacon or trigger event such as a suspected or actual security compromise on the endpoint 310. The analysis facility 340 may reside locally on the endpoint 310 (e.g., be a part of, embedded within, or locally coupled to the endpoint 310). The analysis facility 340 may be an external facility, or it may reside in a virtual appliance (e.g., which could be run by a protected set of systems on their own network systems), a private cloud, a public cloud, and so forth. The analysis facility 340 may store locally-derived threat information for use in subsequent identification, remediation, or other similar activity. The analysis facility 340 may also or instead receive threat information from a third-party source such as any public, private, educational, or other organization that gathers information on network threats and provides analysis and threat detection information for use by others. This third-party information may, for example, be used to improve detection rules or other forensic analysis that might be performed on information in the data log 322.

The analysis facility 340 may create an event graph. In general, the event graph may represent information in the data log 322 in a graph where objects 312 are nodes and events 314 are edges connecting the nodes to one another based on causal or other relationships as generally contemplated herein. The event graph may be used by the analysis facility 340 or other component(s) of the system 300 as part of a root cause analysis and to identify objects 312 compromised by the root cause. The event graph may also or instead be displayed to a user of the system 300 or endpoint 310, e.g., using an interactive user interface or the like.

The system 300 may advantageously use the data log 322 to configure and initialize an analysis in a sandboxed or otherwise isolated environment where the execution of the recorded activity related to a detected security event is allowed to run. That is, rather than uploading a complete image of an endpoint 310 using conventional techniques, the data log 322 may include only a series of events/processes related to the detected event that may be uploaded for execution/analysis. The analysis may thus include executing this series of events/processes in the same order to determine a threat level for the endpoint 310.

The data log 322 may include data from a single endpoint 310, or from a number of endpoints 310, for example where one endpoint 310 accesses a service or a file on another endpoint. This advantageously facilitates tracking or detection of potentially malicious activity that spans multiple devices, particularly where the behavior on a single endpoint does not appear malicious. Thus, the monitoring facility 330 may monitor activity from an endpoint 310 exclusively, or use the full context of activity from all protected endpoints 310, or some combination of these. Similarly, the event graph generated from the data log 322 may include activity from one endpoint 310 exclusively, or use the full context of activity from all protected endpoints 310, or some combination of these. Data logs 322 and event graphs may also or instead be stored for future analyses, e.g., for comparing to future data logs and event graphs.

FIG. 4 is a flowchart of a method for forensic analysis for computer processes. The method 400 may be implemented by any of the systems described above or otherwise herein. The method 400 may be used as part of a root cause analysis, e.g., for determining a root cause of malware on an endpoint, and for identifying computing objects affected by malware, e.g., computing objects causally related to the root cause.

As shown in step 402, the method 400 may include monitoring events on a device, such as a first endpoint. The events may be any as described herein, e.g., events associated with computing objects on the endpoint. The computing objects may, for example include a data file, a process, an application, a registry entry, a network address, a peripheral device, or any of the other computing objects described herein. For example, in an aspect, the computing objects may include one or more network addresses specified at any suitable level of abstraction or according to any suitable protocol such as a uniform resource locator (URL), an Internet Protocol (IP) address, and a domain name, and may include any or a portion of associated path information or the like that might be associated therewith. The computing objects may also or instead include a peripheral device such as a universal serial bus (USB) memory, a camera, a printer, a memory card, a removable bulk storage device, a keyboard, a printer, a scanner, a cellular phone, or any other input or output device that might usefully be connected to an endpoint, a server, a mobile device, and so forth. Events may include information or messages from a threat management facility, firewall, network device, and so on, for example, that may be resident on or in communication with an endpoint. For example, a threat management facility may identify a potential or actual threat, and this may be treated as an event.

In an aspect, monitoring events on a first endpoint may include instrumenting a first endpoint to monitor a number of causal relationships among a number of computing objects. For example, a monitoring facility or other monitoring component (e.g., a component disposed on the first endpoint or otherwise in communication with the first endpoint), may be configured to detect computing objects and to monitor events on the first endpoint that associate the computing objects in a number of causal relationships. Thus, a processor and a memory disposed on the endpoint may be configured to monitor events on the endpoint. A remote server may also or instead be configured to monitor events on the endpoint, for example, to create a data log as contemplated herein.

Implementations may also or instead include monitoring events on multiple endpoints, e.g., endpoints included in an enterprise network or the like. Thus, in an aspect, the one or more computing objects include at least one or more computing object(s) on a device other than the first endpoint, such as a second endpoint in the enterprise network. The device may also or instead include a server configured to provide remote resources to other endpoints, network devices, firewalls, gateways, routers, wireless access points, mobile devices, and so forth.

The causal relationships monitored by the system may include dependencies that form a link or an association between computing objects or events. Useful causal relationships may include a data flow, e.g., linking computing objects based on the flow of data from one computing object to another computing object. The causal relationships may also or instead include a control flow. For example, a first computer program may generate a first event that triggers a second computer program to trigger a second event, thereby creating a causal relationship between the first computer program and the second computer program (and possibly a causal relationship between the first event and the second event). In yet another aspect, the causal relationships may include a network flow. For example, a computing object may access a URL or other remote resource or location and receive data. In this example, there may be a causal relationship between one or more of the computing object, the URL, and the data. It will be understood that the term "causal relationship" and the like is intended to cover a wide range of relationships between computing objects that might be formed by events, and unless explicitly stated to the contrary or otherwise clear from the text, the causal relationships may include anything that can link or associate multiple computing objects (of the same type or different types), e.g., in a directional manner, directly or indirectly.

As shown in step 404, the method 400 may include recording events such as any of the events described above that occur on the endpoint. Thus, each event detected during monitoring may be recorded, e.g., by a data recorder or other component, to provide a data log including a sequence of events causally relating the number of computing objects. As described above, the data recorder may be configured to record events that occur on the endpoint, or events that occur on a plurality of endpoints. The data recorder may be locally disposed on the endpoint or otherwise in communication with the endpoint. The data recorder may also or instead be associated with a monitoring facility or an analysis facility such as any of those described above. The data recorder may record a sequence of events causally relating a number of computing objects on one or more endpoints in a data log or the like disposed in a memory.

A number of events within the sequence of events may be preserved for a predetermined time window. For example, in an aspect, a data recorder or the like may record all activity on an endpoint in a rolling buffer that overwrites data that is older than the predetermined time window. This may be true regardless of the types of computing objects associated with the sequence of events. In another aspect, the predetermined time window may have a different duration for different types of computing objects (e.g., for at least two types of computing objects). By way of example, when the computing objects include one or more network addresses, the sequence of events may be preserved for a longer predetermined time window relative to a sequence of events associated with data files, or vice-versa. Similarly, when the computing objects include one or more peripheral devices such as USB memories, the sequence of events may be preserved for longer predetermined time window relative to a sequence of events associated with applications, or vice-versa. In implementations, the predetermined time window for which the sequence of events is preserved may be based on the likelihood of a security event originating from a certain type of computing object. For example, the reputation of a computing object (e.g., an application) or a machine state may be used for determining the duration of the predetermined time window for which the sequence of events is preserved. Further, the predetermined time window for which the sequence of events is preserved may be determined by a color of a computing object or event, e.g., as described in U.S. patent application Ser. No. 14/485,759 filed on Sep. 14, 2014, which is incorporated by reference herein in its entirety. In an aspect, the time window for which the sequence of events is preserved may be variable or adjustable. For example, a user or administrator using a user interface or the like may adjust the time window for which the sequence of events is preserved, e.g., based on computing object type or otherwise. For example, one or more first event types may be recorded with a first-time window and one or more second event types may be recorded with a second-time window.

In an aspect, the data recorder or the like may record only certain activity on an endpoint, e.g., activity associated with predetermined computing objects. The activity may be preserved for a predetermined amount of time dependent upon the specific computing object to which the activity is associated. In this manner, and by way of example, the data recorder or the like may include a record of data for one week for applications, for three months for files, for two weeks for registry entries, and so forth. It will be understood that these timeframes are provided by way of example and not of limitation.

In general, data may be continuously recorded, periodically recorded, or some combination of these. Furthermore, data may be cached, stored, deleted or transmitted to a remote processing facility in any suitable manner consistent with appropriate use of local and remote resources, and the utility or potential utility of information that is being recorded. In one aspect, data may be periodically deleted or otherwise removed from the data recorder, such as after a security event has been detected and addressed as described below. A new data log may then be created for recording subsequent events on the one or more endpoints.

As shown in step 406, the method 400 may include evaluating one or more events that occur on the endpoint. The evaluation of the one or more events may include the application of one or more security rules to determine whether the one or more events indicate or suggest a security event such as a security compromise event, a data exposure, a malware detection, or the like. Thus, the evaluation of the one or more events may lead to the detection of a security event. While illustrated as a separate step, this step 406 may be performed concurrently with or in sequence with the monitoring step 402 discussed above.

The security event may be any beacon or trigger event, such as any of those discussed herein. The security event may include an event that is related to network security, computer security, data security, data leakage, data exposure, or any other actual or potential security issue. The security event may also or instead include other events of interest that are not directly related to computer/network security where, for example, they are useful for otherwise auditing or monitoring machines or characterizing device behavior. Thus, the security event may be any event general related to operation of a computer, and does not necessarily include an actual security compromise event. However, in implementations, the security event may include an actual compromise to a network, an endpoint, or a computer system such as the detection of malware or any other threat detection. For example, the security event may be a security compromise event related to a specific threat, e.g., an event related to computer-based malware including without limitation a virus, spyware, adware, a Trojan, an intrusion, an advanced persistent threat, spam, a policy abuse, an uncontrolled access, and so forth.

Detecting the security event may include detecting a security compromise by applying a static analysis to software objects on the first endpoint. For example, each software object may be individually analyzed for its compliance with a security policy or the like using signatures or other objective characteristics. It will be understood that while static analysis provides one useful form of evaluation for compliance with the security policy or the like, other techniques may also or instead be employed, e.g., a behavioral analysis, a sandbox execution, network traffic analysis, and so forth.

Detecting the security event may also or instead include detecting a security compromise by applying dynamic or behavioral analysis to code executing on the first endpoint, or to specific computing objects (e.g., processes) on the endpoint. For example, events that can warrant triggering the detection of the security event may include a process that loads a particular file that is known to be malicious, or a process that accesses a known malicious IP address, and the like.

In an aspect, detecting the security event may include detecting a hardware change or other state changes. Detecting the security event may also or instead include detecting a potential data leakage.

As discussed herein, a security policy may be used to detect a security event. This may include, for example, whitelists or blacklists of known computing objects and events, or reputations and signatures thereof. For example, a security policy may include rules that allow computing objects and events that are provided by a known, trusted source (e.g., a trusted user, endpoint, network, company, vendor, and so forth). The rules may be more complex, for example, where originating from a trusted source is only one factor in determining whether to whitelist computing objects and events. In general, the security policy may include any suitable rules, logic, prioritizing, etc., as desired to detect a security event.

Although referred to herein in terms of 'security,' one skilled in the art will recognize that a security policy may also or instead include other types of policies. For example, a security policy may include a corporate or network policy having a list of approved computing objects and events, where computing objects and events outside of this list may not necessarily be security risks, but are otherwise unwanted in the network. Thus, the security policy may intend to detect malware and the like, while also detecting other types of unwanted computing objects and events that do not qualify as malware.

More generally, any technique or combination of techniques suitable for evaluating endpoint activity for the detection of actual or potential security compromises may be used to detect security events as contemplated herein.

As shown in step 408, if a security event is not detected, the method 400 may return to step 402 where monitoring can continue. As further shown in step 408, if a security event is detected, a root cause analysis or the like may be performed to identify a source of the security event as further described below. That is, detecting a security event associated with one of the number of computing objects may trigger further analysis of other causally related computing objects on an endpoint (or in certain cases, remote from an endpoint) to identify a cause of the security event, as distinguished from the symptom that generated the beacon or trigger for the analysis.

As shown in step 410, the method 400 may include generating an event graph. The event graph may be generated in response to detecting the security event, e.g., using the data log from the data recorder. The event graph may be generated at the same time as or as part of creating the data log. The event graph may include the sequence of events causally relating the number of computing objects, and more specifically, the sequence of events and computer objects causally associated with the object(s) that triggered the detected security event.

As discussed herein, the event graph may be generated based on a data log of events and computer objects stored by a data recorder during operation of the endpoint. In particular the data recorder may provide a dump of logged activities, which may be causally associated into a graph for analysis, navigation, display and so forth. Any useful portion of the data log may be used. For example, the data recorder may provide event data for a window of time before, after or surrounding the detected security event. The data log may be filtered, e.g., when the data is written to the data log (for example, by aging events as described above) or when the event graph is generated, or some combination of these. A variety of filtering techniques may be usefully employed. For example, certain types of objects or events may be removed from an event graph for specific trigger events, or certain groups of events may be condensed into a single event, such as all normal activity that occurs when a user logs into an endpoint. Similarly, computing objects that are too remote, either within the event graph or timewise, may be pruned and removed, particularly if they have a known, low diagnostic significance. Thus, the event graph may be filtered and condensed in a variety of manners to obtain a useful snapshot of events optimized for root cause analytics. Filtering of the data may be dependent upon the type of security event that is detected. Filtering of the data may adjust the level of detail included in the event graph based on memory limits, user parameters, security event type, or any other object metrics or inputs. In an aspect, the data is filtered based on reputation or the like, e.g., of computing objects included therein. For example, if an application has a good reputation, the application may not include a high level of detail associated therewith in a filtered version of the data log.

In one aspect, the event graph may be generated based on a data log from a number of different endpoints and thus may represent a causal chain of data from various different endpoints. This approach advantageously permits an analysis using data that spans multiple endpoints or other network devices within a single data structure or package, thus permitting identification of a root cause even when an attack employs a complex, multi-hop approach to network assets that might otherwise evade detection. Event graphs may also or instead be generated separately for different endpoints and presented to a user or analytical system as separate, discrete entities. Event graphs for endpoints may be compared with one another, e.g., as part of the root cause analysis. For example, by analyzing and comparing similar event graphs or event graphs sharing similar computing objects or events, a heuristic approach may be developed for identifying suspicious events and computing objects for one or more endpoints. Similarly, event graphs for different endpoints in the same network enterprise may be compared or combined, e.g., where two or more endpoints have been exposed to a security event or threat. For example, event graphs for similar time periods of two or more endpoints may be ascertained and analyzed.

In an aspect, cross-correlating between different data logs or event graphs may be utilized in a root cause analysis. For example, if the same security event or root cause is identified on different endpoints, the endpoints may be flagged for review or remediation. This type of analysis may be used on different endpoints throughout a network.

Implementations may include a number of different event graphs stored in a data store that can be used together to detect, prevent, or determine the root causes for suspicious activity or other activity of interest, e.g., a security event. As discussed herein, the event graphs may be filtered before being stored in the data store, which can remove system activity that is not of interest in such analyses. The event graphs may be searchable, e.g., for analysis of event graphs including similar computing objects or events. The event graphs may also or instead be linked to one another, e.g., event graphs including similar computing objects or events. The event graphs may be presented to a user on a user interface or the like, e.g., an interactive user interface that allows a user to see similar or related event graphs, search the event graphs, link between event graphs, and so forth.

An event graph may use a conventional structure of nodes (computing objects) and events (edges) to represent causal relationships among computing objects. This permits the use of a wide range of graph-based techniques to assist in analysis of the context leading up to a detected event. At the same time, numerous other data structures, computer representations, and visual representations of such interrelated objects and events are also known in the art, any of which may be employed as an event graph as contemplated herein, provided that enough descriptive data about the context of an endpoint is captured to facilitate the various types of analysis and response contemplated herein.

As shown in step 412, the method 400 may include, in response to detecting the security event, traversing the event graph based on the sequence of events in a reverse order from the one of the computing objects associated with the security event to one or more preceding ones of the computing objects. In general, the reverse order is a causally reverse order. For example, where a network flow, data flow or control flow has a direction from one computing object to another computing object, the reverse order will follow this flow or causal link from the receiving computing object backward toward the source computing object. However, this may also or instead include a chronological flow, such as in a complex event graph where the time of receipt for two different inputs from two different sources is relevant. In general, a review of each of the preceding computing objects may be conducted by working backward from the computing object associated with the security event, e.g., to determine a root cause of the security event. In an aspect, this may include a static analysis of each of the preceding computing objects, or a dynamic analysis of object and event interactions, or some combination of these.

As shown in step 414, the method 400 may include applying one or more rules to the computing objects preceding the security event. For example, the method 400 may include applying a cause identification rule to the preceding ones of the computing objects and the causal relationships while traversing the event graph in order to identify one of the computing objects as a cause of the security event. In general, the root cause analysis may attempt to identify a pattern in the event graph using cause identification rules to identify one of the computing objects (or a group of the computing objects and events) as a root cause of the security event.

The cause identification rule may associate the cause with one or more common malware entry points. For example, common entry points include a word processing application, an electronic mail application, a spreadsheet application, a browser, or a universal serial bus (USB) drive that is attached to an endpoint, and any of these computing objects, when encountered in an event graph, may be identified as a root cause. For example, when traversing the event graph in a reverse order from the security event, if the analysis identifies an electronic mail application that opened an attachment, this may be identified as the root cause because this is often a source of compromised security on an endpoint. Similarly, when traversing the event graph in a reverse order from the security event, if the analysis identifies a USB drive, or an unsecure or unencrypted USB drive, from which a file was opened, this may be identified as a likely cause of the security event. In one aspect, multiple candidate root causes may be identified using the cause identification rules, and a final selection may be based on other contextual information such as reputation, source, etc.

Security events may also or instead be caused by a certain combination of events or combinations of events and computing objects. For example, in an aspect, the cause identification rule may associate the cause of the security event with a combination that includes a first process invoking a second process and providing data to the second process. As used herein, invoking may be interpreted broadly, e.g., where any two processes share data through an intermediate file, or narrowly, e.g., where a first process specifically spawns the second process as a child process. More generally, invoking a process as used herein is intended to broadly include any causal relationship between to processes including, e.g., spawning a process, hijacking a process (e.g., seizing control of an existing process through thread injection, process hollowing, and the like), remotely launching a process over a network, instrumenting a service in the operating system, and the like. A cause identification rule may specify a particular type of invocation relationship between two processes, or multiple types of invocation, or any relationship between two processes. Providing data from a first process to a second process may include creating a file for use by the second process. For example, the cause of a security event may include a first process that writes a file and then takes control of a second process that reads data from the file so that the first process and the second process share data through the file.

Another example of a security event may include a known non-malicious application (e.g., a commonplace word processing application) launching a command line script, which may be identified as a cause of a security event. The activity underlying events that are generated may not necessarily be malicious, but they could lead to security events or other events of interest to be further analyzed. Thus, in one aspect, a cause identification rule may flag this behavior as a root cause of a security event, or as an event that is otherwise of diagnostic interest.

As shown in step 416, the method 400 may include traversing the event graph forward from an identified or presumed cause of the security event to identify one or more other ones of the computing objects affected by the cause. In this manner, an analysis of each of the computing objects in the event graph may be conducted by working forward from the root cause to other causally dependent computing objects that might be compromised or otherwise affected by the root cause. This may include labeling or otherwise identifying the potentially compromised objects, e.g. for remediation or further analysis. A pruning step may also be employed, e.g. where any computing objects that are not causally dependent on the root cause in some way are removed from the event graph.

As shown in step 418, the method 400 may include remediating one or more computing objects affected by the cause of the security event. Remediation may include deleting computing objects from the endpoint, or otherwise remediating the endpoint(s) using computer security techniques such as any described herein. In another aspect, the identification of the root cause may be used to create new detection rules capable of detecting a security event at a point in time (or causation) closer to the root cause within the event graph. Other remediation steps may include forwarding the event graph, or a filtered and pruned event graph, to a remote facility for analysis. This data may usefully provide a map for identifying sources of malware, or for ensuring thorough remediation by identifying all of the potentially compromised computing objects that should be examined after the compromise has been addressed.

FIG. 5 illustrates a graphical depiction of a portion of an example event graph 500. The event graph 500 may include a sequence of computing objects causally related by a number of events, and which provide a description of computing activity on one or more endpoints. The event graph 500 may be generated, for example, when a security event 502 is detected on an endpoint, and may be based on a data log or similar records obtained by an event data recorder during operation of the endpoint. The event graph 500 may be used to determine a root cause 504 of the security event 502 as generally described above. The event graph 500 may also or instead be continuously generated to serve as, or be a part of, the data log obtained by the data recorder. In any case, an event graph 500, or a portion of an event graph 500 in a window before or around the time of a security event, may be obtained and analyzed after a security event 502 occurs determine its root cause 504. The event graph 500 depicted in the figure is provided by way of example only, and it will be understood that many other forms and contents for event graphs 500 are also or instead possible. It also will be understood that the figure illustrates a graphical depiction of an event graph 500, which may be stored in a database or other suitable data structure.

By way of example, the event graph 500 depicted in the figure begins with a computing object that is a USB device 512, which may be connected to an endpoint. Where the USB device 512 includes a directory or file system, the USB device 512 may be mounted or accessed by a file system on an endpoint to read contents. The USB device 512 may be detected 513 and contents of the USB device 512 may be opened 514, e.g., by a user of the endpoint. The USB device 512 may include one or more files and application, e.g., a first file 516, a second file 518, and a first application 520. The first file 516 may be associated with a first event 522 and the second file may be associated with a second event 524. The first application 520 may access one or more files on the endpoint, e.g., the third file 526 shown in the figure. The first application 520 may also or instead perform one or more actions 528, such as accessing a URL 530. Accessing the URL 530 may download or run a second application 532 on the endpoint, which in turn accesses one or more files (e.g., the fourth file 534 shown in the figure) or is associated with other events (e.g., the third event 536 shown in the figure).

In the example provided by the event graph 500 depicted in the figure, the detected security event 502 may include the action 528 associated with the first application 520, e.g., accessing the URL 530. By way of example, the URL 530 may be a known malicious URL or a URL or network address otherwise associated with malware. The URL 530 may also or instead include a blacklisted network address that although not associated with malware may be prohibited by a security policy of the endpoint or enterprise network in which the endpoint is a participant. The URL 530 may have a determined reputation or an unknown reputation. Thus, accessing the URL 530 can be detected through known computing security techniques.

In response to detecting the security event 502, the event graph 500 may be traversed in a reverse order from a computing object associated with the security event 502 based on the sequence of events included in the event graph 500. For example, traversing backward from the action 528 leads to at least the first application 520 and the USB device 512. As part of a root cause analysis, one or more cause identification rules may be applied to one or more of the preceding computing objects having a causal relationship with the detected security event 502, or to each computing object having a causal relationship to another computing object in the sequence of events preceding the detected security event 502. For example, other computing objects and events may be tangentially associated with causally related computing objects when traversing the event graph 500 in a reverse order—such as the first file 516, the second file 518, the third file 525, the first event 522, and the second event 524 depicted in the figure. In an aspect, the one or more cause identification rules are applied to computing objects preceding the detected security event 502 until a cause of the security event 502 is identified.

In the example shown in the figure, the USB device 512 may be identified as the root cause 504 of the security event 502. In other words, the USB device 512 was the source of the application (the first application 520) that initiated the security event 502 (the action 528 of accessing the potentially malicious or otherwise unwanted URL 530).

The event graph 500 may similarly be traversed going forward from one or more of the root cause 504 or the security event 502 to identify one or more other computing objects affected by the root cause 504 or the security event 502. For example, the first file 516 and the second 518 potentially may be corrupted because the USB device 512 included malicious content. Similarly, any related actions performed after the security event 502 such as any performed by the second application 532 may be corrupted. Further testing or remediation techniques may be applied to any of the computing objects affected by the root cause 504 or the security event 502.

The event graph 500 may include one or more computing objects or events that are not located on a path between the security event 502 and the root cause 504. These computing objects or events may be filtered or 'pruned' from the event graph 500 when performing a root cause analysis or an analysis to identify other computing objects affected by the root cause 504 or the security event 502. For example, computing objects or events that may be pruned from the event graph 500 may include the USB drive 510 and the USB device being detected 513.

It will be appreciated that the event graph 500 depicted in FIG. 5 is an abstracted, simplified version of actual nodes and events on an endpoint for demonstration. Numerous other nodes and edges will be present in a working computing environment. For example, when a USB device is coupled to an endpoint, the new hardware will first be detected, and then the endpoint may search for suitable drivers and, where appropriate, present a user inquiry of how the new hardware should be handled. A user may then apply a file system to view contents of the USB device and select a file to open or execute as desired, or an autorun.exe or similar file may be present on the USB device that begins to execute automatically when the USB device is inserted. All of these operations may require multiple operating system calls, file system accesses, hardware abstraction layer interaction, and so forth, all of which may be discretely represented within the event graph 500, or abstracted up to a single event or object as appropriate. Thus, it will be appreciated that the event graph 500 depicted in the drawing is intended to serve as an illustrative example only, and not to express or imply a particular level of abstraction that is necessary or useful for root cause identification as contemplated herein.

The event graph 500 may be created or analyzed using rules that define one or more relationships between events and computing objects. The C Language Integrated Production System (CLIPS) is a public domain software tool intended for building expert systems, and may be suitably adapted for analysis of a graph such as the event graph 500 to identify patterns and otherwise apply rules for analysis thereof. While other tools and programming environments may also or instead be employed, CLIPS can support a forward and reverse chaining inference engine suitable for a large amount of input data with a relatively small set of inference rules. Using CLIPS, a feed of new data can trigger a new inference, which may be suitable for dynamic solutions to root cause investigations.

An event graph such as the event graph 500 shown in the figure may include any number of nodes and edges, where computing objects are represented by nodes and events are represented by edges that mark the causal or otherwise directional relationships between computing objects such as data flows, control flows, network flows and so forth. While processes or files are common forms of nodes that might appear in such a graph, any other computing object such as an IP address, a registry key, a domain name, a uniform resource locator, a command line input or other object may also or instead be designated to be a node in an event graph as contemplated herein. Similarly, while an edge may be formed by an IP connection, a file read, a file write, a process invocation (parent, child, etc.), a process path, a thread injection, a registry write, a domain name service query, a uniform resource locator access and so forth other edges may be designated. As described above, when a security event is detected, the source of the security event may serve as a starting point within the event graph 500, which may then be traversed backward to identify a root cause using any number of suitable cause identification rules. The event graph 500 may then usefully be traversed forward from that root cause to identify other computing objects that are potentially tainted by the root cause so that a more complete remediation can be performed.

Figure 6:
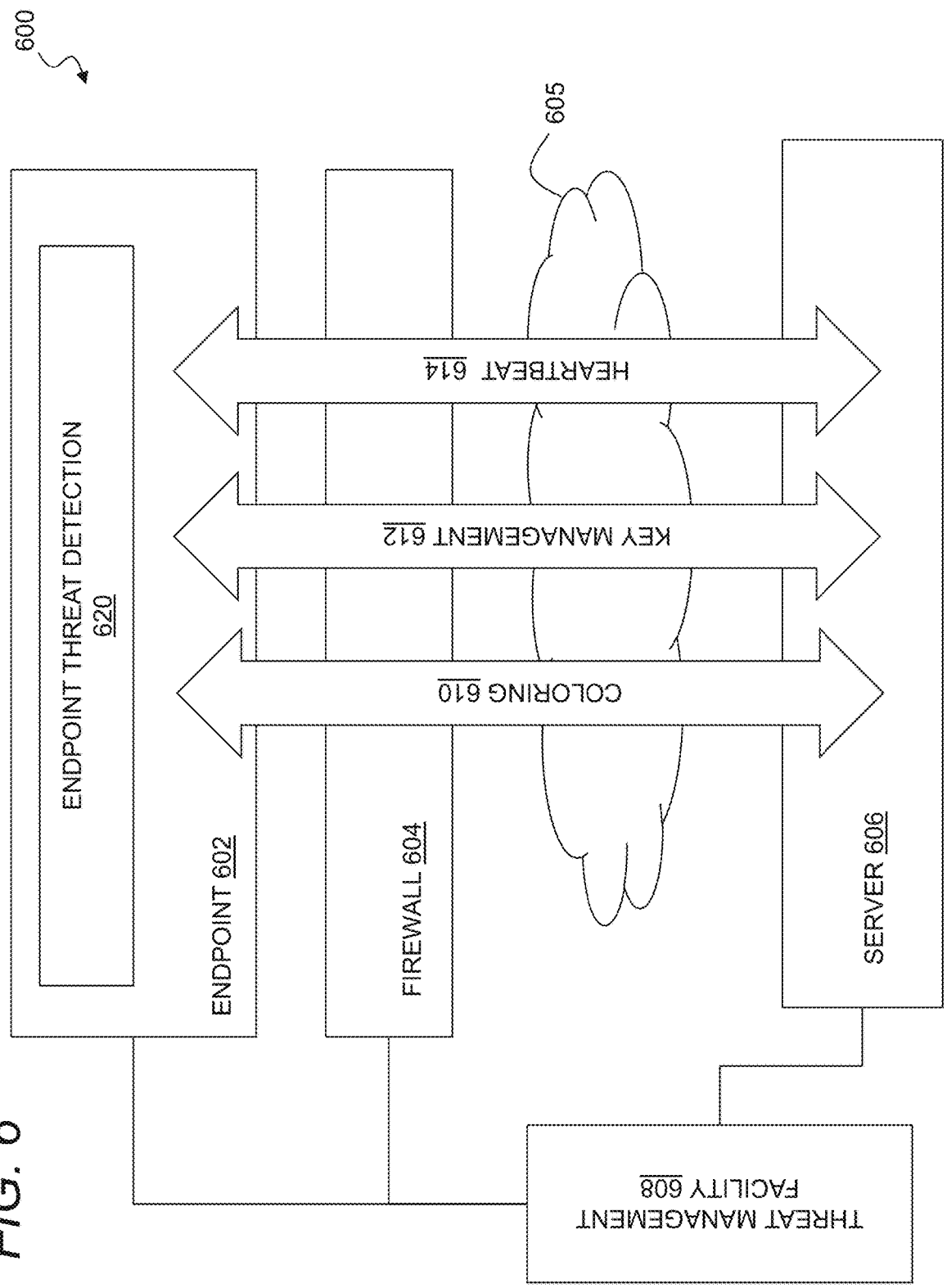
FIG. 6 illustrates a threat management system.

FIG. 6 illustrates a threat management system according to some implementations. In general, the system 600 may include an endpoint 602, a firewall 604, a server 606 and a threat management facility 608 coupled to one another directly or indirectly through a data network 605, all as generally described above. Each of the entities depicted in FIG. 6 may, for example, be implemented on one or more computing devices such as the computing device described above with reference to FIG. 2. A number of systems may be distributed across these various components to support threat detection, such as a coloring system 610, a key management system 612 and a heartbeat system 614 (or otherwise an endpoint health system), each of which may include software components executing on any of the foregoing system components, and each of which may communicate with the threat management facility 608 and an endpoint threat detection agent 620 executing on the endpoint 602 to support improved threat detection and remediation.

The coloring system 610 may be used to label or 'color' software objects for improved tracking and detection of potentially harmful activity. The coloring system 610 may, for example, label files, executables, processes, network communications, data sources and so forth with any suitable label. A variety of techniques may be used to select static and/or dynamic labels for any of these various software objects, and to manage the mechanics of applying and propagating coloring information as appropriate. For example, a process may inherit a color from an application that launches the process. Similarly, a file may inherit a color from a process when it is created or opened by a process, and/or a process may inherit a color from a file that the process has opened. More generally, any type of labeling, as well as rules for propagating, inheriting, changing, or otherwise manipulating such labels, may be used by the coloring system 610 as contemplated herein.

The key management system 612 may support management of keys for the endpoint 602 in order to selectively permit or prevent access to content on the endpoint 602 on a file-specific basis, a process-specific basis, an application-specific basis, a user-specific basis, or any other suitable basis in order to prevent data leakage, and in order to support more fine-grained and immediate control over access to content on the endpoint 602 when a security compromise is detected. Thus, for example, if a particular process executing on the endpoint is compromised, or potentially compromised or otherwise under suspicion, access by that process may be blocked (e.g., with access to keys revoked) in order to prevent, e.g., data leakage or other malicious activity.

The heartbeat system 614 may be used to provide periodic or aperiodic information from the endpoint 602 or other system components about system health, security, status, and so forth. The heartbeat system 614 or otherwise an endpoint health system may thus in general include a health status report system for the endpoint 602, such as through the use of a heartbeat system or the like. A heartbeat may be encrypted or plaintext, or some combination of these, and may be communicated unidirectionally (e.g., from the endpoint 608 to the threat management facility 608) or bidirectionally (e.g., between the endpoint 602 and the server 606, or any other pair of system components) on any useful schedule.

In general, these various monitoring and management systems may cooperate to provide improved threat detection and response. For example, the coloring system 610 may be used to evaluate when a particular process is potentially opening inappropriate files, and a potential threat may be confirmed based on an interrupted heartbeat from the heartbeat system 614. The key management system 612 may then be deployed to revoke access by the process to certain resources (e.g., keys or file) so that no further files can be opened, deleted or otherwise modified. More generally, the cooperation of these systems enables a wide variety of reactive measures that can improve detection and remediation of potential threats to an endpoint.

Figure 7:
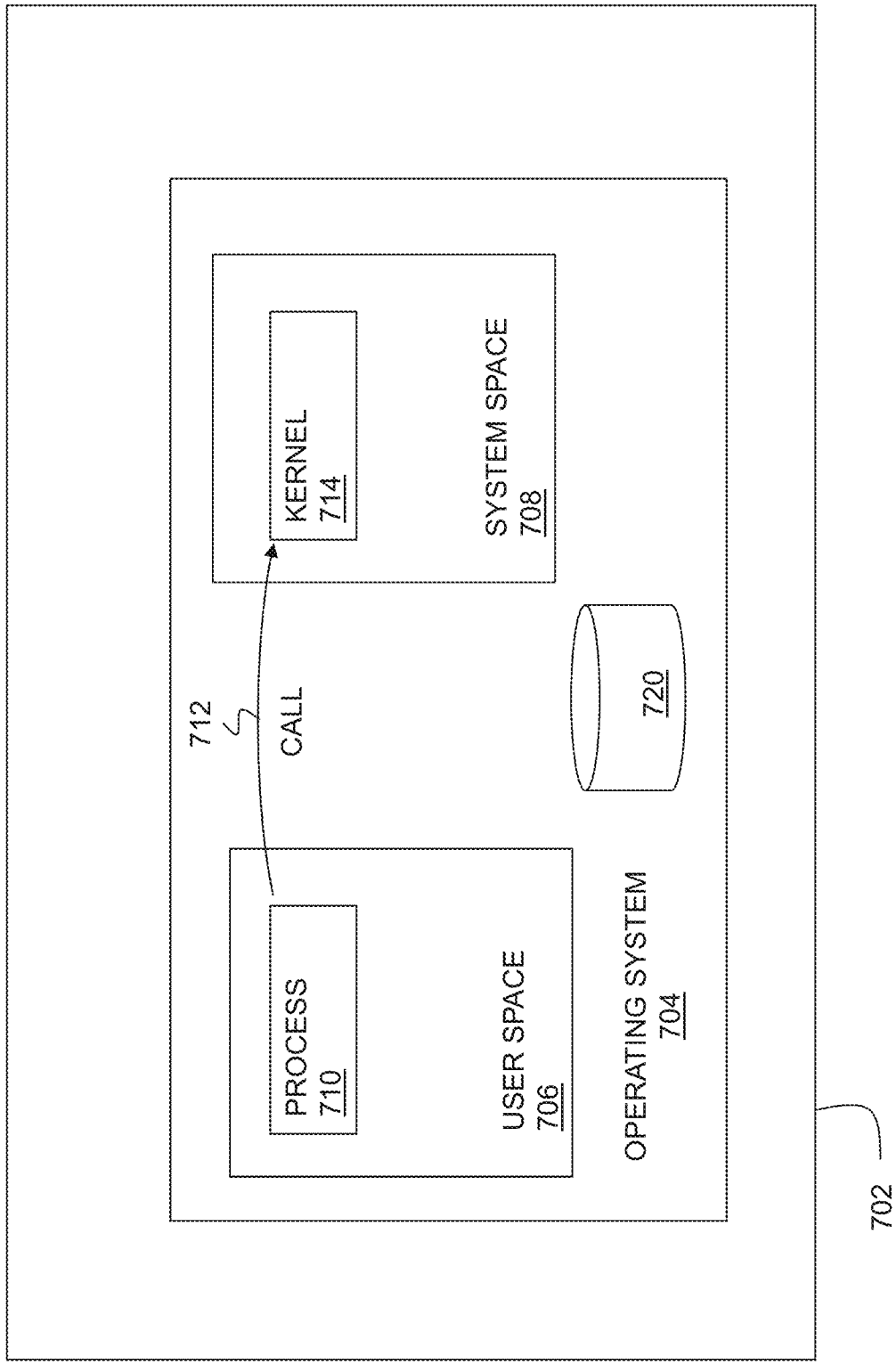
FIG. 7 shows a block diagram for a computing device.

FIG. 7 shows a block diagram of a computing system. In general, the system 700 may execute on any of the computing devices contemplated herein. For example, the system 700 may include a computing device 702 executing an operating system 704 with a user space 706 and a system space 708. According to general computing principles, the operating system 704 may include any system software that manages computer hardware and software resources and provides common service for computer programs such as input, output, memory allocation, and so forth. In general, an application will execute in the user space 706, e.g., as a process 710 (or multiple processes 710) and may function calls 712 into a kernel 714 executing in the system space 708 as needed. In one aspect relevant to the following disclosure, this may include memory related functions such as memory allocation and control over whether particular areas of memory are writeable or executable.

In one aspect, the computing device 702 may store information useful for executing low-level machine code in a data structure 720 such as a register, cache, memory, or the like.

Figure 8:
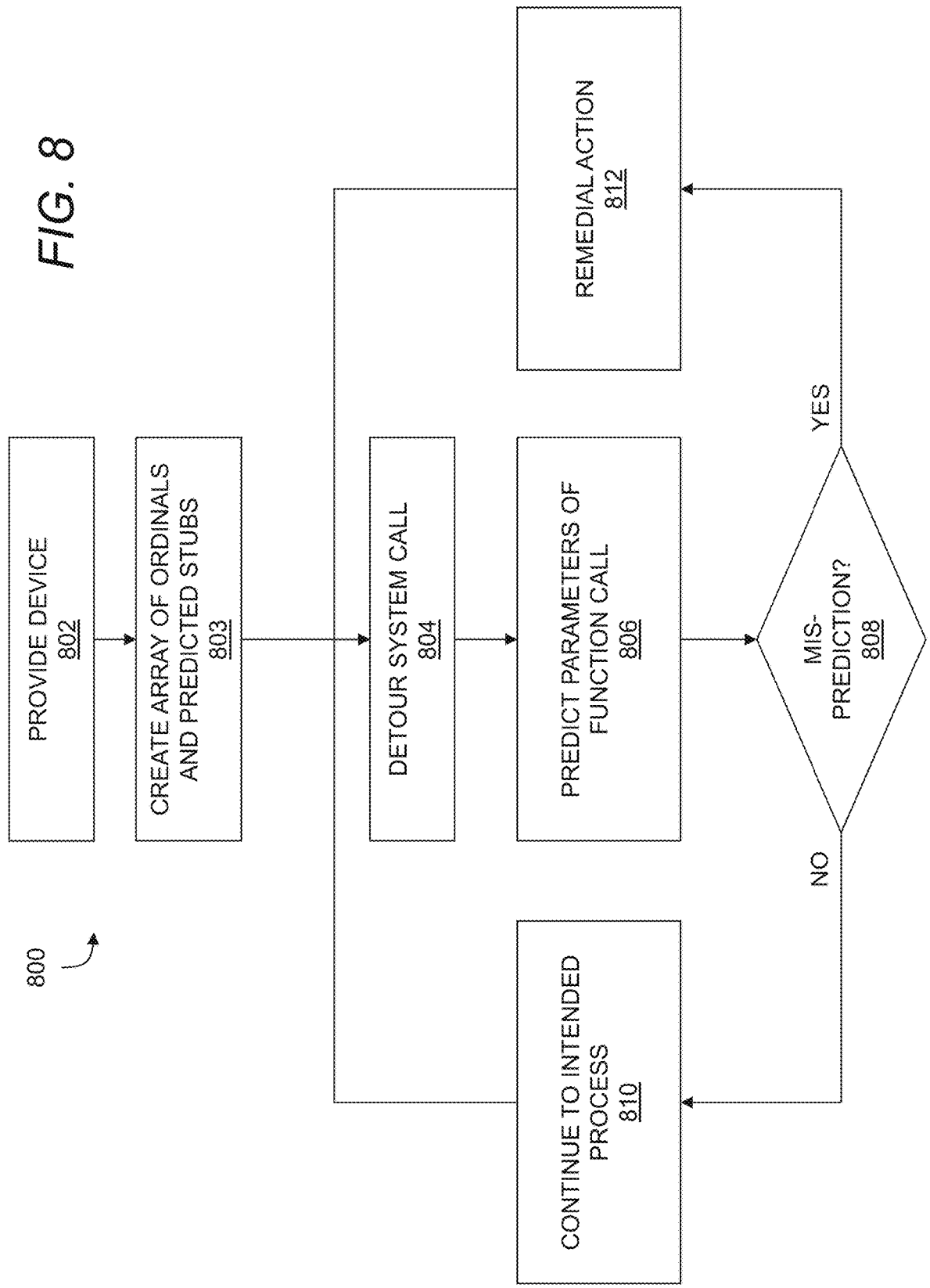
FIG. 8 shows a method for attack mitigation.

FIG. 8 shows a method for attack mitigation. More specifically, there is disclosed a method 800 for mitigating trampoline-based attacks. In general, a trampoline-based attack is an attack, such as a buffer overflow attack, in which a return address in program code is overwritten with an address that contains code (e.g., one or more opcodes) that causes execution to jump to data or instructions provided by or desired by an attacker. While a variety of techniques have been attempted to prevent malicious deployment of instructions, this type of attack may evade such protection attempts by redirecting program flow so as to avoid those protections. The method 800 may also be used to mitigate return-oriented programming attacks, where a series of return addresses and other data on the stack may be used by an attacker to selectively execute code of a program.

As shown in step 802, the method may begin with providing a computing device executing an operating system with a user space and a system space, such as any of the computing devices described herein.

As shown in step 803, the method 800 may include constructing an array of ordinals and expected stubs for a number of kernel functions. While numerous techniques are available for predicting or otherwise determining stub locations, ordinals, and other information based on a name or other identifier within an operating system, and more specifically within a kernel of a system space, an array may be pre-compiled so that the prediction can be efficiently performed using a lookup based on any available information used to specify or call a particular function.

As shown in step 804, the method 800 may include detouring a call from a process executing in the user space into a kernel executing in the system space. In general, malicious code will seek to access the kernel in order to gain control of a device, and the threshold between the user space (e.g., for applications and the like) and system space (e.g., for the kernel and low-level machine functions, etc.) provides a useful nexus for detouring potentially harmful function calls. In particular, the call may include a call for a memory function such as a memory allocation function or a memory protection function. Similarly, this may include a call to remove data execution protection for a portion of a memory, or otherwise manipulate memory, e.g., to provide an executable address space for deploying malicious code. In another aspect, this may be a call exploiting known vulnerabilities or security holes in existing operating systems, such as a call invoking a function for handling a call from an application for a 32-bit processing environment within a 64-bit processing environment.

The security process that receives this detour may, for example, be any suitable process executing in the user space on the computing device, or some other remote location suitable for monitoring system calls on the device.

As shown in step 806, the method 800 may include determining a predicted address and a predicted ordinal for the call, such as within the security process that received the detour of a system call as described above. In general, a program using an import address table, export address table, or other index or data structure to access functions will have a predicable ordinal for any known function, and the predicted ordinal may include an identifier or similar value predicted to be used by the computing device to correlate a function call with an address of the function. The predicted ordinal may, for example, be determined based on the function name (or other identifier) and the precomputed array described above, where the method includes accessing the array to look up the predicted ordinal for at least one function. This may also or instead be determined using system information that is statically or dynamically determined for a computing device using any techniques appropriate to a particular operating system, hardware, or the like.

In general, the predicted address may be the memory address of the first instruction of a function that is associated with a given ordinal. The predicted address may be obtained using any suitable techniques. For example, a predicted address may be based on information in a return address stack, information in a branch prediction buffer or other actual or speculative processing pipeline, or information in a branch predictor or other circuit or process configured to predict the outcome of branches in a processing pipeline.

As shown in step 808, the method 800 may include determining whether there is a mismatch between the predicted results and the actual results of instruction execution. This may, for example, include performing a comparison of the predicted address and the predicted ordinal to an actual address and an actual ordinal for the function that was detoured, and detecting a possible attack when a mismatch is detected during the comparison.

It will be appreciated that branch prediction techniques may also generally be used to identify mismatches between expected and actual behavior in a manner useful for detecting trampoline-based attacks. Thus, in step 808, the method 800 may also or instead include comparing the results of branch prediction to actual addresses of instructions executed by the computing device, and detecting the possible return-oriented programming attack based upon detection of a mismatch between the branch prediction and the branch taken. In some implementations, an indication of mismatch may be an indication of a cache miss in an instruction cache.

As shown in step 810, where there is no misprediction an inference may be made that the computing device is operating properly and no malicious code using a trampoline-based attack is present. In this case, the method 800 may include returning control to a function and execution may proceed normally with subsequent instructions. For example, the function associated with the ordinal may be executed.

As shown in step 812, remedial action may be initiated. Where a mismatch is detected between the predicted and actual values for the return address, the ordinal, or both, then an inference may be made that a return-oriented programming attack is present. Under these circumstances, any suitable remedial action may be initiated.

The remedial action may, for example, include responding to the possible return-oriented programming attack by updating a health status of the computing device. The health status may be reported in a heartbeat generated by the computing device. For example, a heartbeat may be periodically issued from the computing device that implicitly or explicitly encodes health status information in a variety of manners. This health status, and the corresponding heartbeat, may be updated upon the identification of an actual or potential attack. The remedial action may also or instead include responding to the possible return-oriented programming attack by coloring at least one of a file, a process, or an application with an indication of the possible return-oriented programming attack. This coloring may be used, e.g., to track exposure, identify relevant computing objects for remediation, and so forth. The remedial action may also or instead include responding to the possible return-oriented programming attack by initiating a root cause analysis on the computing device. Using the techniques described above, this may be used to provide relevant forensic data for identifying a source of the attack, remediating the attack, or creating improved detection strategies.

In one aspect, control may be further redirected from the calling process to some other process based on application-level remediation, or to some other instructions based on control flow integrity or the like. In another aspect, control may be returned to the calling process, e.g., where an attack is present but the calling process is not responsible for the attack.

In another aspect, there is disclosed herein a system including a memory and one or more processors executing an operating system with a user space and a system space. The memory may store computer-executable code that is executable by the one or more processors to perform the steps of detouring a call from the user space into a kernel executing in the system space to a security process, determining a predicted address and a predicted ordinal for the call in the security process, performing a comparison of the predicted address and the predicted ordinal to an actual address and an actual ordinal for a function of the call, and detecting a possible return-oriented programming attack when a mismatch is detected during the comparison. If a mismatch is not detected, the function associated with the ordinal may be executed.

FIG. 9 illustrates examples of identification of return-oriented programming attacks. For example, in an aspect, a last branch record (LBR), call address register, or the like, referred to generally as a return address register (RAR), may provide process predictive branches (and metadata associated therewith) based on a history of executed branches used by processes/functions, which are recorded in the return address register.

In one aspect, the return address register may be configured so that only return instructions are recorded. Thus, all return address register entries (which may be limited to 8, 16 or 32 entries, or another number, for example depending on processor model or architecture) may be used for recording 'From-To' pairs, caused by executing 'RETurn' instructions. In the examples shown in the figure, the 'CALL X' and 'CALL Y' instructions are "CALL-reg instructions," meaning that they are calls that use a register containing the target address—e.g., 'CALL EAX' or 'CALL ESI'. Address 'Y' may be the address of a function that is located in the IAT and is guarded by systems as described herein—e.g., Y may be a critical function that is guarded by the IAT protection mechanisms described herein.

The first table 902 shows an example of a program, where information for a plurality of addresses 904 is shown, including the instruction 906, the most recent RETURN ADDRESS REGISTER line 908, whether it was predicted 910, and the return address on stack 912. In the first table 902, a 'normal' program flow is linear starting at the address 'Addr_A' where a call is made to a subroutine, located at address 'X'. After some time, the program flow returns from this subroutine to 'Addr_B'. At that moment, the most recent return address register entry will indicate that a RETurn has been performed from X' to Addr_B (it is worth noting that X' is actually X plus the length of the subroutine, but for simplicity X' is used). In the example, because the processor has executed the CALL X instruction at Addr_A, it was able to predict the return to Addr_B. Hence, the predicted state of the return address register entry will be 'YES' as shown. When the program continues to execute, a CALL Y is performed. When the subroutine starting at address Y ends at address Y', it will return to 'Addr_C'. At that moment, the most recent return address register entry will indicate that a RETurn instruction has been executed which has caused the program flow to change from Y' to Addr_C. Because the CALL Y instruction at Addr_B was executed, the processor was able to predict this return. So, the predicted state of this return address register entry will also be 'YES' as shown.

The second table 920 shows an example of a return-oriented programming (ROP) attack. Here, in this example, an attacker has crafted a ROP chain that uses the instructions from this example program in its ROP-chain. The example assumes that the attacker has gained control over the stack contents (which contains the ROP-chain) and the instruction pointer. Assuming that the instruction pointer is set to 'Addr_Z' and the top of the stack is Addr_B, when the RETurn instruction from Addr_Z is executed, the program flow is changed to Addr_B.

When the program continues to execute, the CALL Y is performed, where it is assumed that this call leads to a function that is 'hooked' by detection mechanisms, for example, in a stub as described herein. So, at this moment, a check is performed to determine if the call to the hooked function is caused by a normal program flow, or by an ROP attack. The analysis to determine if an ROP attack is occurring reads the most recent return address register entry. This entry indicates that the processor was directed to Addr_B because of a RETurn instruction. So, an analysis mechanism may check to verify that there is a CALL instruction before Addr_B, which would explain why the processor would eventually RETurn to Addr_B. The analysis mechanism thus attempts to determine if it is plausible that the program flow has RETurned to Addr_B. Note that the analysis mechanism cannot determine if the CALL that is located before Addr_B has actually been executed, if it has only from-to information from the return address register entry. Note also that the analysis mechanism may not be able to determine if X and Z are the same values when the CALL X is performed using a 'CALL-reg' instruction, so, for example, X and Z were stored in a processor register (for example 'EAX' or 'ESI') which contents may have changed.

In the example, if the analysis mechanism only has the from-to information from the return address register entry, it may determine that it is plausible that the RETurn to Addr_B is caused by normal program flow, because Addr_B is preceded by a CALL instruction. Thus, it cannot determine that the program flow is hijacked due to an ROP attack. However, if the analysis mechanism also has information about branch prediction, it would know that the branch to Addr_B was not predicted. This is not expected, since, in the 'normal' program flow scenario as shown above in the first table 902, the predicted flag will be 'YES'. Thus, by taking this extra information into the analysis mechanism, it may be determined that the CALL X from Addr_A has not really been executed, and that an ROP attack is taking place. This may enable systems to detect an on-going ROP attack even, for example, when a ROP gadget is call-preceded.

Figure 10:
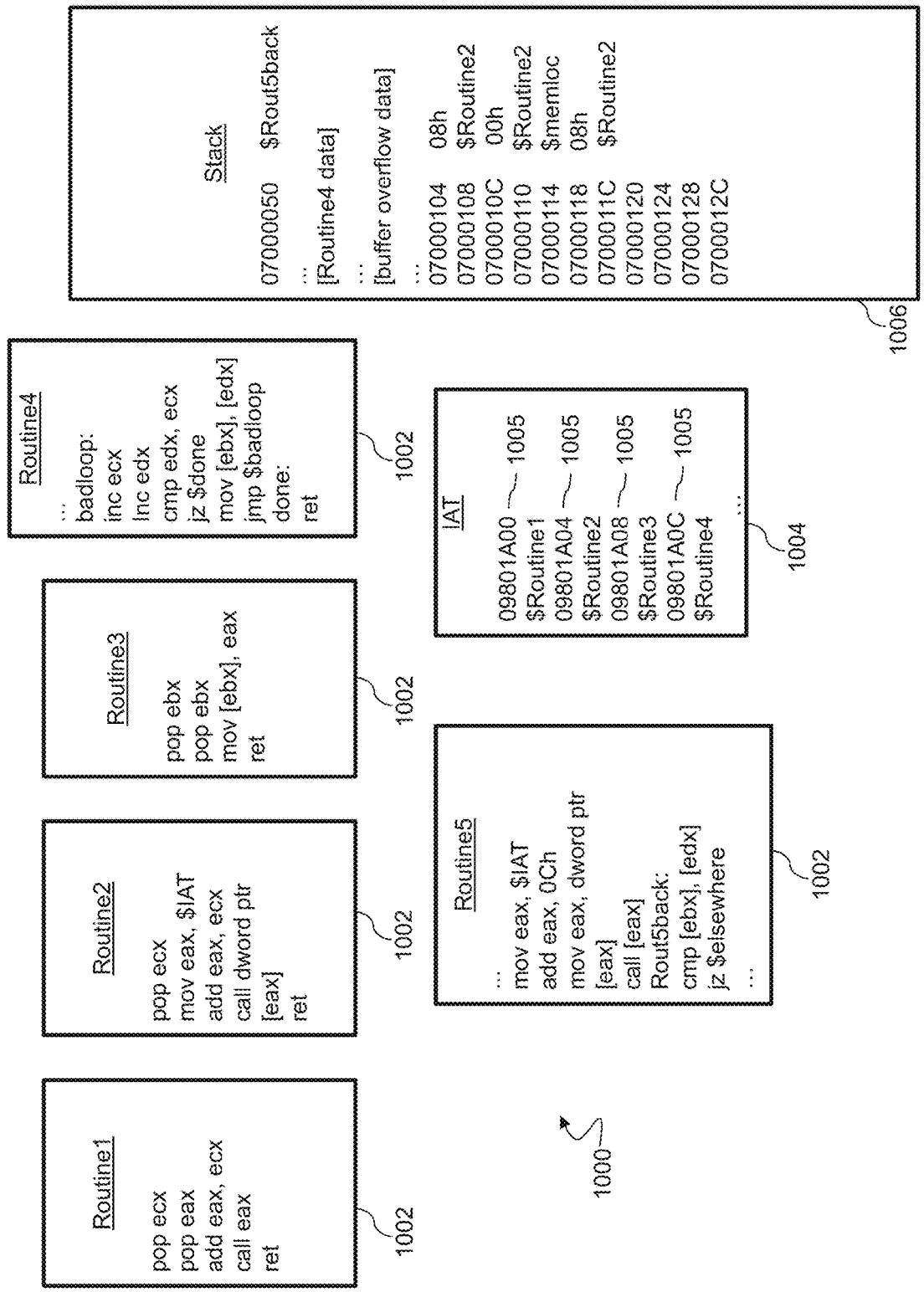
FIG. 10 illustrates an example of a return-oriented programming attack.

FIG. 10 illustrates an example of a return-oriented programming attack. In this simplified example 1000, there are five routines 1002, Routine1, Routine2, Routine3, and Routine4, and Routine5, which are part of an existing program. The program may have an import address table (IAT) 1004 that includes the addresses 1005 of each routine. As shown in this example, Routine 2 will pop an offset off of the stack 1006, and call the routine that is listed at that address in the IAT 1004. This is an example of a 'CALL-reg' instruction described earlier, where a call uses data in a register rather than an absolute address.

In this example, Routine5 calls Routine4. In this example, Routine4 is vulnerable to a buffer overflow attack. An attacker may determine that the attacker is able to put data on the stack 1006 using the buffer overflow attack. In this example, the attacker also knows the address of Routine2, which allows the attacker to call functions in the IAT 1004. The attacker places offsets and the address of Routine2 onto the stack 1006, and the processor returns into the function in the IAT 1004. The address after the instruction that called Routine4 (Rout5back) is on the stack 1006 at 07000050. After that, on the stack 1006 is Routine4 data, and then the data created by the buffer overflow.

Here, the stack 1006 pointer points to 0700011C. The processor executes the return, which takes it to Routine2. Routine2 takes the offset 08h, which calls the routine listed at 09801A08, which in this case is Routine3. The call to Routine3 pops the address of the instruction after the call, and then pops the address memloc off of the stack 1006 into ebx. So, the attacker can store the current value of eax, which is the offset 08h, to the memory location memloc. When the return is executed, Routine2 will be executed again, now with the offset 00h, which points to Routine1 in the IAT 1004. In this example, because the attacker knows the address of Routine2 and has control of the stack, the attacker can call any of the routines in the IAT using the offset from the base IAT address.

Figure 11:
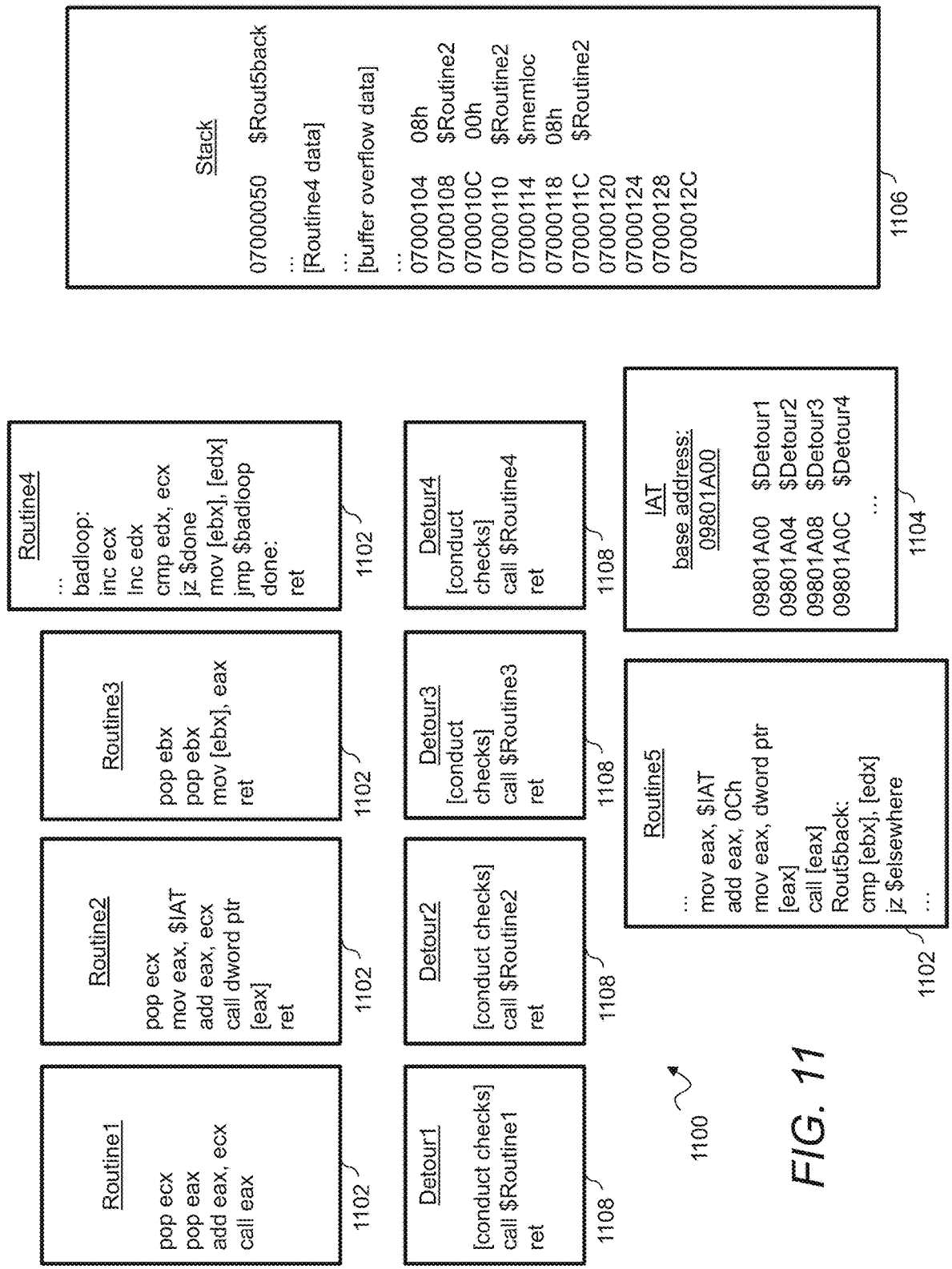
FIG. 11 illustrates an example of a return-oriented programming attack.

FIG. 11 illustrates an example of a mitigation of a return-oriented programming attack. In this example 1100, a number of detours 1108 have been inserted into the IAT 1104, so that each IAT entry goes to a detour 1108 (e.g., Detour1, Detour2, Detour3, Detour4) rather than directly to the routine 1102.

This time, when Routine2 is called with the offset 08h, the IAT 1104 directs further processing to Detour3, which then calls Routine3. On the return from Routine3, Detour3 conducts checks, including a check of the instruction cache, to see whether the execution of Detour3 was predicted. The instruction cache hardware was not expecting to go to Detour3, but rather was expecting to go back to Rout5back, which is the last address that was pushed by a call instruction before the buffer overflow. The resulting cache miss indicates a problem with the program flow. More generally, any return address misprediction or similar control-flow error indicative of a return-oriented programming attack or similarly malicious buffer overflow exploit may be used to detect an attack as contemplated herein. An instruction cache miss, or an indication that a return was not predicted, may be an indicia of a return oriented programming attack.

Figure 12:
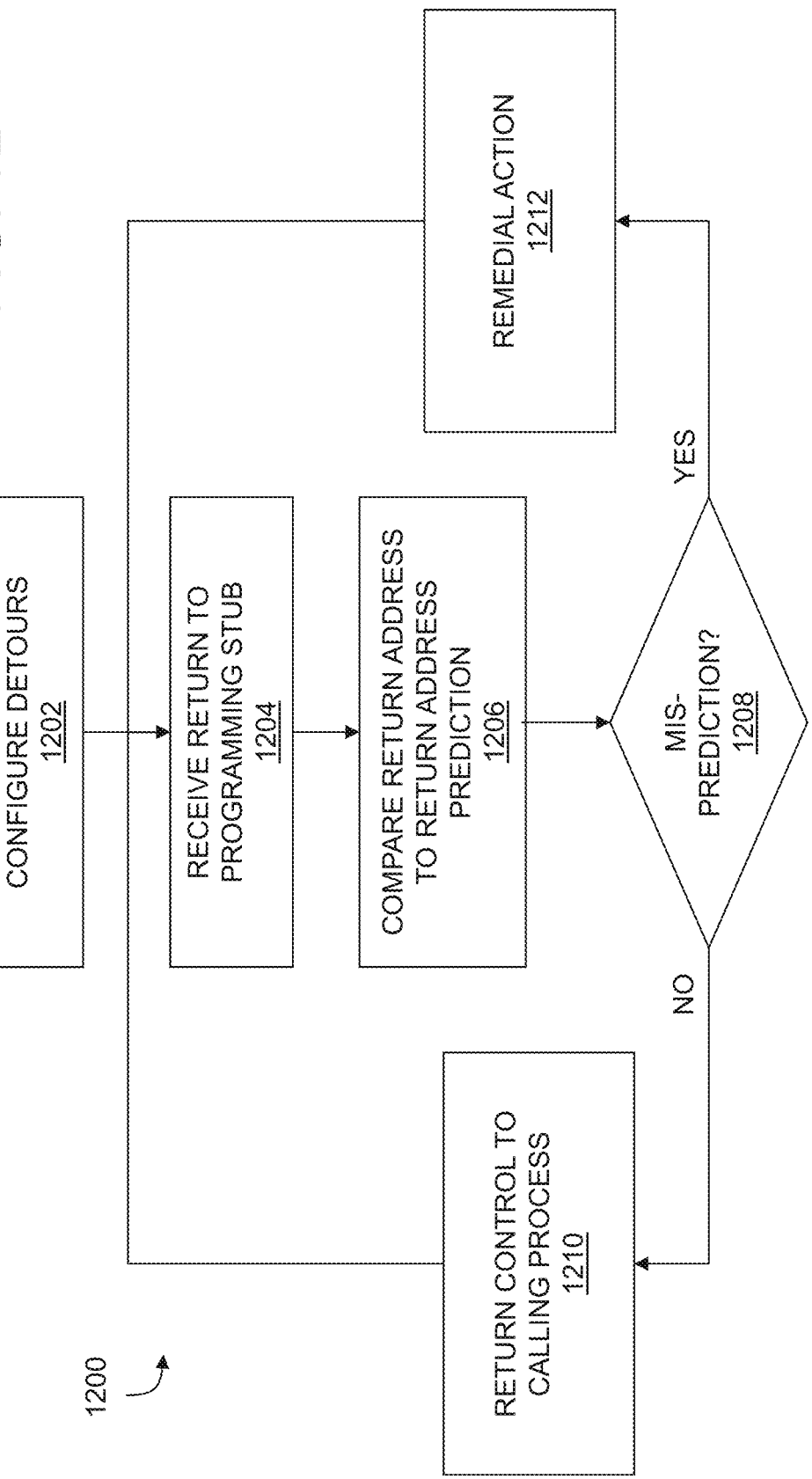
FIG. 12 shows a method for hardware-assisted filtering of an import address table.

FIG. 12 shows a method for hardware-assisted filtering of an import address table. In general, traffic through an import address table or similar function directory or the like may be monitored through a set of detours that provide predetermined return addresses for one or more monitored function calls. When a call to one of these functions was not predicted, malicious activity can be inferred.

As shown in step 1202, the method 1200 may include configuring a computing environment to detour function calls. This may, for example include configuring a computing environment (e.g., a computer) to detour a function call to a stub. In general, the computing environment may include a return address register that stores an address for a return from a number of function calls. In normal operation, the computing environment will generate a return address prediction when a function call is received as a result of any normal call. When the address prediction did not correctly predict, and there is a cache miss, this is an indication of compromise.

In another aspect, this may include the detouring of a collection of functions that might be targeted by an attacker. Thus, the method 1200 may include instrumenting the computing environment to monitor system calls by detouring a plurality of system functions to a plurality of stubs created to provide predetermined return addresses for the corresponding system functions. The ultimate goal of many return-oriented programming attacks is to reconfigure memory areas so that they are executable. Once this is done, malicious code may be directly inserted into memory by an attacker and executed as desired. Thus, detouring may be advantageously directed to system calls in general, and memory control functions in particular. In one aspect, the function call may include a call transferring control from a user space to a kernel in a system space.

This approach of providing an explicit detour for certain function calls may be particularly advantageous in computing environments that already employ address space layout randomization to protect memory against buffer overflow attacks. Thus, in one aspect the computing environment uses an import address table to access system function calls, and in another aspect, the computing environment uses address space layout randomization to randomize the location of functions accessed through the import address table.

As shown in step 1204, the method 1200 may include returning to the stub with a return instruction using the address stored in the return address register. During normal execution, this will be the same return address placed on the return address register when the function associated with the detour stub was initially called (from the detour stub itself). During a return-oriented programming attack, however, a buffer overflow or similar exploit may have been employed to misdirect a return into a particular gadget (portion of code) targeted by an attacker. While the targeted code may successfully (or speculatively) execute, the predicted return from that code will point to the detour stub, while the actual return will be directed to whatever address is then at the top of the return address register.

As shown in step 1206, the method 1200 may include comparing the address to the return address prediction. In general, the return address prediction may be generated in a number of ways. In one aspect, an algorithm may be employed to directly predict the return address based on the function that is called or any other useful or relevant information. In another aspect, this may include speculatively fetching and executing a branch of programming code to provide the predicted return address. In many processors, this may be performed as part of instruction caching, so that instructions are available ahead of the time that they are needed for processing. Instructions may be cached based on speculative determination about code that will be executed. More generally, any technique for predicting a return address may be usefully employed in combination with a detour that consistently provides a predictable detection of return-oriented programming attacks as contemplated herein.

As shown in step 1208, the method 1200 may include conditionally generating an indication of a return-oriented programming attack, or a possible return-oriented programming attack, when the address does not match the return address prediction.

As shown in step 1210, the method 1200 may include return control from the detour stub to the calling process when the return address in the stub was correctly predicted, i.e., there was no misprediction.

As shown in step 1212, the method 1200 may include any suitable remediation when the return address in the stub was not correctly predicted, i.e., there was a misprediction of a return address that did not match the stub location for return from the function call.

The remedial action may, for example, include responding to the indication of the possible return-oriented programming attack by updating a health status of the computing device in a heartbeat generated by the computing device. For example, a heartbeat may be periodically issued from the computing device that implicitly or explicitly encodes health status information in a variety of manners. This health status, and the corresponding heartbeat, may be updated upon the identification of an actual or potential attack. The remedial action may also or instead include responding to the indication of the possible return-oriented programming attack by coloring at least one of a file, a process, or an application with an indication of the possible return-oriented programming attack. This coloring may be used, e.g., to track exposure, identify relevant computing objects for remediation, and so forth. The remedial action may also or instead include responding to the indication of the possible return-oriented programming attack by initiating a root cause analysis on the computing device. Using the techniques described above, this may be used to provide relevant forensic data for identifying a source of the attack, remediating the attack, or creating improved detection strategies.

In one aspect, control may be further redirected from the calling process to some other process based on application-level remediation, or to some other instructions based on control flow integrity or the like. In another aspect, control may be returned to the calling process, e.g., where an attack is present but the calling process is not responsible for the attack.

In another aspect, there is disclosed herein a system for mitigating return-oriented programming attacks with import address table filtering. The system may include a memory and one or more processors executing an operating system with a user space and a system space. The memory may store computer executable code that is executable by the one or more processors to perform the step of configuring a computing environment to detour a function call to a stub that provides a return address for the function call, where the computing environment includes a return address register that stores an address for a return from the function call, and where the computing environment generates a return address prediction pointing to the stub when the function call is received, the computer executable code further configuring the one or more processors to perform the steps of returning to the stub with a return instruction using the address stored in the return address register, comparing the address to the return address prediction, and generating an indication of a return-oriented programming attack when the address does not match the return address prediction.

The one or more processors may be further configured to respond to an indication of a possible return-oriented programming attack by updating a health status of the computing device in a heartbeat generated by the computing device. The one or more processors may also or instead be configured to respond to the indication of the possible return-oriented programming attack by coloring at least one of a file, a process, or an application with an indication of the possible return-oriented programming attack. The one or more processors may also or instead be configured to respond to the indication of the possible return-oriented programming attack by initiating a root cause analysis on the computing device.

Figure 13:
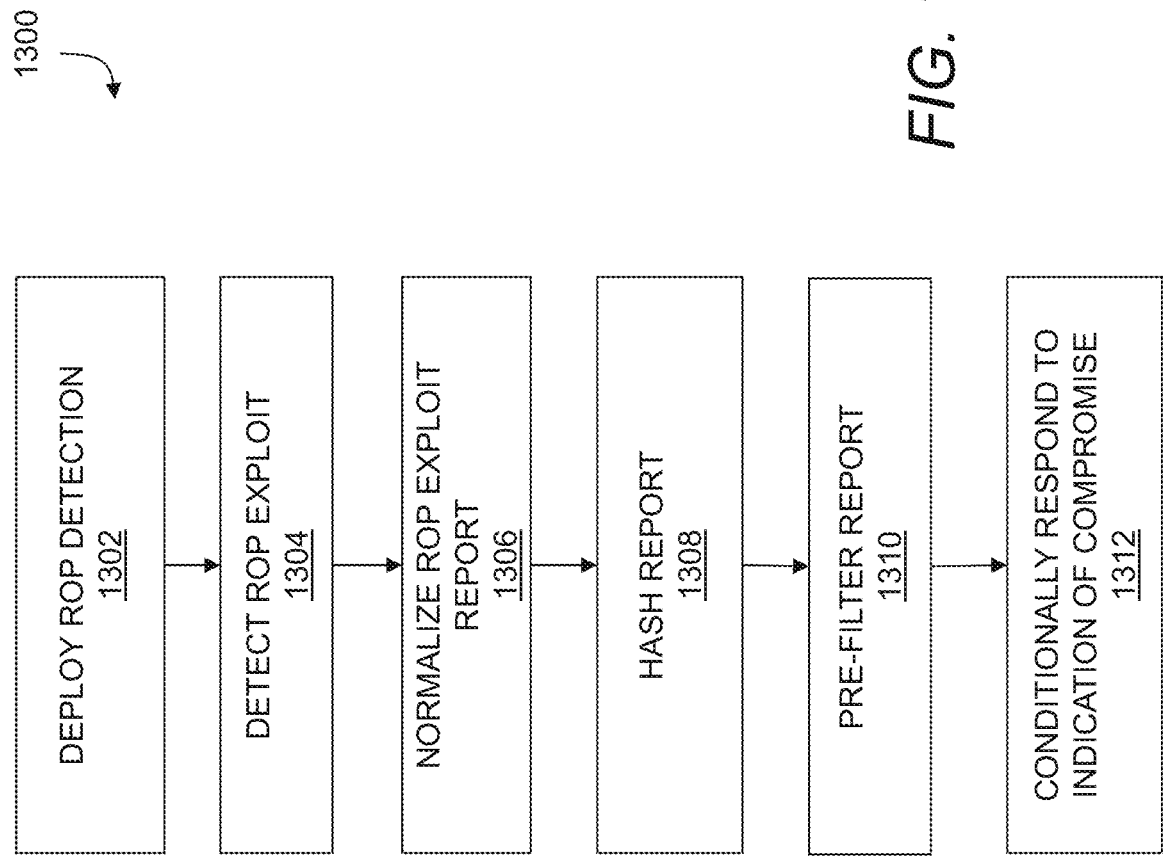
FIG. 13 shows a method for suppressing false positive detections of return-oriented programming attacks.

FIG. 13 shows a method for suppressing false positive detections of return-oriented programming attacks.

As shown in step 1302, the method 1300 may begin with deploying a security measure to detect control-flow integrity compromises indicative of a return-oriented programming attack (ROP) exploit on a computing device. This may include any of the ROP detection techniques described herein. More generally, this may include any technique or combination of techniques useful for detecting actual or possible ROP attacks. For example, the security measure may detect the ROP exploit based on return address misprediction. The security measure may also or instead detect the ROP exploit based on branch misprediction. The security measure may also or instead detect the ROP exploit based on an indirect call or jump misprediction. More generally, any characteristic of instruction execution or compromise of control-flow integrity that tends to indicate the presence of an ROP attack may be usefully employed to detect an actual or possible ROP attack as contemplated herein.

As shown in step 1304, the method 1300 may include receiving a report of a possible ROP exploit from the security measure. In general, the ROP report may include any information useful for evaluating the event(s) causing the report. For example, this may include contextual information for the possible ROP exploit such as path information for one or more files associated with the possible ROP exploit and branch information for one or more processes associated with the possible ROP exploit.

As shown in step 1306, the method 1300 may include normalizing the report to isolate machine-specific variations in the path information and the branch information. This may permit direct comparison of contextual information across different machines, machine configurations, and so forth. In one aspect, the path information may be normalized according to a directory, for example so that a file name is independent of the directory location, or so that a number of different functionally equivalent directories will appear the same in the report. In another aspect, the branch information may be normalized so that all addresses within the branch information are reported relative to a loaded module containing the branch. The specifics of normalization will be highly dependent on the processing context and the information of diagnostic significance within the report. By way of a non-limiting example, FIG. 14 provides an example of branch information in a non-normalized report 1402 and a normalized report 1404.

As shown in step 1308, the method 1300 may include hashing the report to provide a hashed report. In general, this may include creating a compressed representation of the data in the report that permits subsequent comparison to other reports. A variety of suitable hashing techniques are known in the art and may be adapted to use for hashing a report as contemplated herein.

As shown in step 1310, the method 1300 may include pre-filtering the hashed report with a filter to determine if the hashed report contains a known false-positive for the possible ROP exploit. In general, the normalized and hashed report may provide a compact fingerprint or representation for the circumstances or context of the ROP candidate. If the normalization effectively removes machine-specific aspects of the context, and if the report matches a known set of false positive conditions, then the hashed report should be identical to other false positive reports for the same set of conditions. This permits rapid pre-filtering using any suitable comparison that facilitates the identification of identical data sets.

A variety of filtering techniques may be suitably employed to determine if a hashed report—descriptive of a normalized context indicating a possible ROP exploit—belongs to a collection of known false positives for a ROP attack. One suitable technique is a Bloom filter, which provides a computationally efficient and space-efficient probabilistic data structure to test whether an element is a member of a set. With a Bloom filter, false positives are possible but false negatives are not. Using a Bloom filter, a computing device can rapidly determine whether the hash report is definitely in a set of known false positives. Thus, in one aspect the filter includes a Bloom filter to determine whether the hashed report belongs to a collection of known false positive reports. Other techniques may also or instead be adapted for pre-filtering hashed reports as contemplated herein.

In another aspect, the filter may include a crowd-sourced filter derived from reports of false positives received from a plurality of sources. The crowd-sourced filter may be created by aggregating false-positive information at any suitable network-accessible location such as a threat management facility or enterprise gateway. The crowd-sourced filter may be deployed, e.g., as a Bloom filter, at a remote location where the filter is maintained in a continuously updating fashion, or the crowd-sourced filter may be periodically distributed to endpoints for local use in false-positive detection as contemplated herein.

As shown in step 1312, the method may include responding to an indication of compromise when the report of the possible ROP exploit does not contain a known false-positive. Remediation may include any suitable remediation including without limitation terminating a process, quarantining a process, restarting a process, initiating a remedial program, or any other technique or combination of techniques suitable for protecting the computing device against the detected exploit. In one aspect, this may include coloring a computing object such as a file, an application or a process associated with the possible ROP exploit to indicate that the computing object is not associated with the possible ROP exploit.

In one aspect, a system for suppressing false-positives of return-oriented programming attack detection includes a memory for non-transitory storage of computer-readable data and one or more processors executing an operating system with a user space and a system space. The memory may store computer executable code that is executable by the one or more processors to perform the steps of deploying a security measure to detect control-flow integrity compromises indicative of a return-oriented programming (ROP) exploit on a computing device; receiving a report of a possible ROP exploit from the security measure, the report including contextual information for the possible ROP exploit, where the contextual information further includes path information for one or more files associated with the possible ROP exploit and branch information for one or more processes associated with the possible ROP exploit; normalizing the report to isolate machine-specific variations in the path information and the branch information; hashing the report to provide a hashed report; pre-filtering the hashed report with a filter to determine if the hashed report contains a known false-positive for the possible ROP exploit; and responding to an indication of compromise when the report of the possible ROP exploit does not contain a known false-positive.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer-executable code and/or any inputs or outputs from same.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions.

Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it may be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context. Absent an explicit indication to the contrary, the disclosed steps may be modified, supplemented, omitted, and/or re-ordered without departing from the scope of this disclosure.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A computer program product for mitigating trampoline-based attacks, the computer program product comprising computer executable code embodied in a non-transitory computer-readable medium that, when executing on one or more processors, performs the steps of:
   providing a computing device executing an operating system with a user space and a system space;
   configuring the computing device to detour one or more function calls for kernel functions to one or more stub locations corresponding to one or more security processes that provide predetermined return addresses for the kernel functions;
   constructing an array including ordinals identifying the kernel functions and, for each one of the ordinals, a respective stub location of one of the one or more security processes for one of the kernel functions identified by the given one of the ordinals;
   when a call for a memory function of the kernel functions is made from a process executing in the user space into a kernel executing in the system space, detouring the call to one of the security processes;
   in the one of the one or more security processes, determining a predicted return address and a predicted ordinal for the call using a lookup in the array;
   performing a comparison of the predicted return address and the predicted ordinal from the array to an actual return address and an actual ordinal for a function of the call;
   detecting a possible return-oriented programming attack when a mismatch is detected during the comparison; and
   returning control to a calling process that initiated the call to the function.

2. The computer program product of claim 1 wherein the predicted ordinal includes an identifier used by the computing device to correlate a name of the function of the call with an address of the function.

3. The computer program product of claim 1 wherein the call includes a memory allocation function.

4. The computer program product of claim 1 wherein the call includes a memory protection function.

5. A method comprising:
   providing a computing device executing an operating system with a user space and a system space;
   configuring the computing device to detour one or more function calls for kernel functions to one or more stub locations corresponding to one or more security processes that provide predetermined return addresses for the kernel functions;
   constructing an array including ordinals identifying the kernel functions and, for each one of the ordinals, a respective stub location of one of the one or more security processes for one of the kernel functions identified by the given one of the ordinals;
   when a call is made from a process executing in the user space into a kernel executing in the system space, detouring the call to one of the security processes;
   in the one of the one or more security processes, determining a predicted return address and a predicted ordinal for the call using a lookup in the array;

performing a comparison of the predicted return address and the predicted ordinal from the array to an actual return address and an actual ordinal for a function of the call; and detecting a possible return-oriented programming attack based on a mismatch in the comparison.

6. The method of claim 5 further comprising returning control to a calling process that initiated the call to the function.

7. The method of claim 5 wherein the predicted return address includes a return address where the call is predicted by the computing device to return control after completion of a called function.

8. The method of claim 5 wherein the predicted ordinal includes an identifier used by the computing device to correlate a name of a function in the call with an address of the function.

9. The method of claim 5 further comprising providing a branch prediction in the one of the one or more security processes, comparing the branch prediction to a branch taken during execution of instructions by the computing device, and detecting the possible return-oriented programming attack based upon detection of a second mismatch between the branch prediction and the branch taken.

10. The method of claim 5 wherein the call invokes a function for handling a call from an application for a 32-bit processing environment within a 64-bit processing environment.

11. The method of claim 5 wherein the call includes a memory allocation function.

12. The method of claim 5 wherein the call includes a memory protection function.

13. The method of claim 5 wherein the call removes data execution protection for a portion of a memory.

14. The method of claim 5 further comprising constructing an array of ordinals and expected stubs for a number of kernel functions, and accessing the array to look up the predicted ordinal for at least one function.

15. The method of claim 5 further comprising responding to the possible return-oriented programming attack by updating a health status of the computing device in a heartbeat generated by the computing device.

16. The method of claim 5 further comprising responding to the possible return-oriented programming attack by coloring at least one of a file, a process, or an application with an indication of the possible return-oriented programming attack.

17. The method of claim 5 further comprising responding to the possible return-oriented programming attack by initiating a root cause analysis on the computing device.

18. A system comprising:
one or more processors executing an operating system with a user space and a system space;
a memory for non-transitory storage of computer-readable data; and
computer executable code stored in the memory and executable by the one or more processors to perform the steps of configuring the one or more processors to detour one or more function calls for kernel functions to one or more stub locations corresponding to one or more security processes that provide predetermined return addresses for the kernel functions, constructing an array including ordinals identifying the kernel functions and, for each one of the ordinals, a respective stub location of one of the one or more security processes for one of the kernel functions identified by the given one of the ordinals, when a call for a function of the kernel functions is made from a process executing in the user space into a kernel executing in the system space, detouring the call to one of the security processes, determining a predicted return address and a predicted ordinal for the call using a lookup in the array, performing a comparison of the predicted return address and the predicted ordinal from the array to an actual return address and an actual ordinal for a function of the call, and detecting a possible return-oriented programming attack when a mismatch is detected during the comparison.

19. The system of claim 18 wherein the call is a memory function call including one or more of a memory allocation function, a memory protection function, and a data execution protection function.

20. The system of claim 18 wherein the call invokes a function for handling a call from an application for a 32-bit processing environment within a 64-bit processing environment.

* * * * *